(12) United States Patent
Kothari

(10) Patent No.: US 7,420,725 B2
(45) Date of Patent: Sep. 2, 2008

(54) DEVICE HAVING A CONDUCTIVE LIGHT ABSORBING MASK AND METHOD FOR FABRICATING SAME

(75) Inventor: Manish Kothari, Cupertino, CA (US)

(73) Assignee: IDC, LLC, San Francisco, CA (US)

(*) Notice: Subject to any disclaimer, the term of this patent is extended or adjusted under 35 U.S.C. 154(b) by 187 days.

(21) Appl. No.: 11/119,432

(22) Filed: Apr. 29, 2005

(65) Prior Publication Data
US 2006/0077516 A1    Apr. 13, 2006

Related U.S. Application Data

(60) Provisional application No. 60/613,480, filed on Sep. 27, 2004.

(51) Int. Cl.
G02B 26/00    (2006.01)
G02B 26/08    (2006.01)

(52) U.S. Cl. .................. 359/237; 359/290; 359/291; 359/295; 359/296; 359/223; 359/243; 359/254; 348/203

(58) Field of Classification Search .................. 359/290, 359/291, 295, 298, 223, 224, 237, 243, 245, 359/247, 254, 587, 850, 871, 872; 345/54, 345/85, 540; 257/99, 706, 758, 773, 774, 257/776; 348/203, 205; 438/53, 622; 385/147
See application file for complete search history.

(56) References Cited

U.S. PATENT DOCUMENTS 2,534,846 A   12/1950  Ambrose et al.
3,439,973 A   4/1969   Paul et al.
3,443,854 A   5/1969   Weiss (Continued)

FOREIGN PATENT DOCUMENTS

DE    4108966 A1    9/1992

(Continued)

OTHER PUBLICATIONS

Akasaka, "Three-Dimensional IC Trends", Proceedings of IEEE, vol. 74, No. 12, pp. 1703-1714, (Dec. 1986).

(Continued)

*Primary Examiner*—Loha Ben
(74) *Attorney, Agent, or Firm*—Knobbe Martens Olson & Bear LLP

(57) ABSTRACT

A system and method for an optical component that masks non-active portions of a display and provides an electrical path for one or more display circuits. In one embodiment an optical device includes a substrate, a plurality of optical elements on the substrate, each optical element having an optical characteristic which changes in response to a voltage applied to the optical element, and a light-absorbing, electrically-conductive optical mask disposed on the substrate and offset from the plurality of optical elements, the optical mask electrically coupled to one or more of the optical elements to provide one or more electrical paths for application of voltages to the one or more optical elements. In another embodiment a method of providing an electrical signal to a plurality of optical elements of a display comprises electrically coupling an electrically-conductive light-absorbing mask to one or more optical elements, and applying a voltage to the mask to activate the one or more optical elements.

26 Claims, 13 Drawing Sheets

U.S. PATENT DOCUMENTS

| | | |
|---|---|---|
| 3,653,741 A | 4/1972 | Marks |
| 3,656,836 A | 4/1972 | de Cremoux et al. |
| 3,725,868 A | 4/1973 | Malmer, Jr. et al. |
| 3,813,265 A | 5/1974 | Marks |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,377,324 A | 3/1983 | Durand et al. |
| 4,389,096 A | 6/1983 | Hori et al. |
| 4,392,711 A | 7/1983 | Moraw et al. |
| 4,403,248 A | 9/1983 | te Velde |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,666,254 A | 5/1987 | Itoh et al. |
| 4,681,403 A | 7/1987 | Te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,859,060 A | 8/1989 | Katagiri et al. |
| 4,900,136 A | 2/1990 | Goldburt et al. |
| 4,900,395 A | 2/1990 | Syverson et al. |
| 4,937,496 A | 6/1990 | Neiger et al. |
| 4,954,789 A | 9/1990 | Sampsell |
| 4,956,619 A | 9/1990 | Hornbeck |
| 4,965,562 A | 10/1990 | Verhulst |
| 4,982,184 A | 1/1991 | Kirkwood |
| 5,018,256 A | 5/1991 | Hornbeck |
| 5,022,745 A | 6/1991 | Zayhowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,345,328 A | 9/1994 | Fritz et al. |
| 5,355,357 A | 10/1994 | Yamamori et al. |
| 5,358,601 A | 10/1994 | Cathey |
| 5,365,283 A | 11/1994 | Doherty et al. |
| 5,381,232 A | 1/1995 | van Wijk |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |

| | | | | | | |
|---|---|---|---|---|---|---|
| 5,608,468 | A | 3/1997 | Gove et al. | 6,232,936 B1 | 5/2001 | Gove et al. |
| 5,610,438 | A | 3/1997 | Wallace et al. | 6,239,777 B1 | 5/2001 | Sugahara et al. |
| 5,610,624 | A | 3/1997 | Bhuva | 6,243,149 B1 | 6/2001 | Swanson et al. |
| 5,610,625 | A | 3/1997 | Sampsell | 6,282,010 B1 | 8/2001 | Sulzbach et al. |
| 5,614,937 | A | 3/1997 | Nelson | 6,288,472 B1 | 9/2001 | Cabuz et al. |
| 5,619,059 | A | 4/1997 | Li et al. | 6,288,824 B1 * | 9/2001 | Kastalsky .................. 359/254 |
| 5,619,365 | A | 4/1997 | Rhoades et al. | 6,295,154 B1 | 9/2001 | Laor et al. |
| 5,619,366 | A | 4/1997 | Rhoads et al. | 6,316,289 B1 | 11/2001 | Chung |
| 5,629,790 | A | 5/1997 | Neukermans et al. | 6,323,982 B1 | 11/2001 | Hornbeck |
| 5,633,652 | A | 5/1997 | Kanbe et al. | 6,327,071 B1 | 12/2001 | Kimura |
| 5,636,052 | A | 6/1997 | Arney et al. | 6,331,909 B1 | 12/2001 | Dunfield |
| 5,636,185 | A | 6/1997 | Brewer et al. | 6,335,831 B2 | 1/2002 | Kowarz et al. |
| 5,638,084 | A | 6/1997 | Kalt | 6,356,254 B1 | 3/2002 | Kimura |
| 5,638,946 | A | 6/1997 | Zavracky | 6,356,378 B1 | 3/2002 | Huibers |
| 5,641,391 | A | 6/1997 | Hunter et al. | 6,358,021 B1 | 3/2002 | Cabuz |
| 5,646,768 | A | 7/1997 | Kaeriyama | 6,376,787 B1 | 4/2002 | Martin et al. |
| 5,650,881 | A | 7/1997 | Hornbeck | 6,407,851 B1 | 6/2002 | Islam et al. |
| 5,654,741 | A | 8/1997 | Sampsell et al. | 6,417,868 B1 | 7/2002 | Bock et al. |
| 5,657,099 | A | 8/1997 | Doherty et al. | 6,433,917 B1 | 8/2002 | Mei et al. |
| 5,659,374 | A | 8/1997 | Gale, Jr. et al. | 6,438,282 B1 | 8/2002 | Takeda et al. |
| 5,661,591 | A | 8/1997 | Lin et al. | 6,447,126 B1 | 9/2002 | Hornbeck |
| 5,665,997 | A | 9/1997 | Weaver et al. | 6,449,084 B1 | 9/2002 | Guo |
| 5,673,139 | A | 9/1997 | Johnson | 6,456,420 B1 | 9/2002 | Goodwin-Johansson |
| 5,677,785 | A * | 10/1997 | Koo et al. .................. 359/291 | 6,465,355 B1 | 10/2002 | Horsley |
| 5,683,591 | A | 11/1997 | Offenberg | 6,466,190 B1 | 10/2002 | Evoy |
| 5,703,710 | A | 12/1997 | Brinkman et al. | 6,466,354 B1 | 10/2002 | Gudeman |
| 5,710,656 | A | 1/1998 | Goossen | 6,466,358 B2 | 10/2002 | Tew |
| 5,726,480 | A | 3/1998 | Pister | 6,473,072 B1 | 10/2002 | Comiskey et al. |
| 5,739,945 | A | 4/1998 | Tayebati | 6,473,274 B1 | 10/2002 | Maimone et al. |
| 5,740,150 | A | 4/1998 | Uchimaru et al. | 6,480,177 B2 | 11/2002 | Doherty et al. |
| 5,745,193 | A | 4/1998 | Urbanus et al. | 6,496,122 B2 | 12/2002 | Sampsell |
| 5,745,281 | A | 4/1998 | Yi et al. | 6,525,867 B1 * | 2/2003 | Oakley et al. ............... 359/323 |
| 5,751,469 | A | 5/1998 | Arney et al. | 6,545,335 B1 | 4/2003 | Chua et al. |
| 5,771,116 | A | 6/1998 | Miller et al. | 6,548,908 B2 | 4/2003 | Chua et al. |
| 5,784,190 | A | 7/1998 | Worley | 6,549,338 B1 | 4/2003 | Wolverton et al. |
| 5,784,212 | A | 7/1998 | Hornbeck | 6,552,840 B2 | 4/2003 | Knipe |
| 5,786,927 | A | 7/1998 | Greywall | 6,574,033 B1 | 6/2003 | Chui et al. |
| 5,793,504 | A | 8/1998 | Stoll | 6,589,625 B1 | 7/2003 | Kothari et al. |
| 5,808,780 | A | 9/1998 | McDonald | 6,600,201 B2 | 7/2003 | Hartwell et al. |
| 5,808,781 | A | 9/1998 | Arney et al. | 6,606,175 B1 | 8/2003 | Sampsell et al. |
| 5,818,095 | A | 10/1998 | Sampsell | 6,608,268 B1 | 8/2003 | Goldsmith |
| 5,825,528 | A | 10/1998 | Goosen | 6,624,944 B1 | 9/2003 | Wallace et al. |
| 5,835,255 | A | 11/1998 | Miles | 6,625,047 B2 | 9/2003 | Coleman, Jr. |
| 5,838,484 | A | 11/1998 | Goossen | 6,630,786 B2 | 10/2003 | Cummings et al. |
| 5,842,088 | A | 11/1998 | Thompson | 6,632,698 B2 | 10/2003 | Ives |
| 5,905,482 | A | 5/1999 | Hughes et al. | 6,635,919 B1 | 10/2003 | Melendez et al. |
| 5,912,758 | A | 6/1999 | Knipe et al. | 6,643,069 B2 | 11/2003 | Dewald |
| 5,920,417 | A * | 7/1999 | Johnson ...................... 359/223 | 6,650,455 B2 | 11/2003 | Miles |
| 5,943,158 | A | 8/1999 | Ford et al. | 6,657,832 B2 | 12/2003 | Williams et al. |
| 5,959,763 | A | 9/1999 | Bozler et al. | 6,660,656 B2 | 12/2003 | Cheung et al. |
| 5,986,796 | A | 11/1999 | Miles | 6,666,561 B1 | 12/2003 | Blakley |
| 5,994,174 | A | 11/1999 | Carey et al. | 6,674,090 B1 | 1/2004 | Chua et al. |
| 6,028,690 | A | 2/2000 | Carter et al. | 6,674,562 B1 | 1/2004 | Miles et al. |
| 6,038,056 | A | 3/2000 | Florence et al. | 6,674,563 B2 | 1/2004 | Chui et al. |
| 6,040,937 | A | 3/2000 | Miles | 6,680,792 B2 | 1/2004 | Miles |
| 6,046,840 | A | 4/2000 | Huibers | 6,710,908 B2 | 3/2004 | Miles et al. |
| 6,049,317 | A | 4/2000 | Thompson et al. | 6,741,377 B2 | 5/2004 | Miles |
| 6,055,090 | A | 4/2000 | Miles | 6,741,383 B2 | 5/2004 | Huibers et al. |
| 6,056,406 | A | 5/2000 | Park et al. | 6,741,384 B1 | 5/2004 | Martin et al. |
| 6,061,075 | A | 5/2000 | Nelson et al. | 6,741,503 B1 | 5/2004 | Farris et al. |
| 6,097,145 | A | 8/2000 | Kastalsky et al. | 6,747,785 B2 | 6/2004 | Chen et al. |
| 6,099,132 | A | 8/2000 | Kaeriyama | 6,747,800 B1 | 6/2004 | Lin |
| 6,100,872 | A | 8/2000 | Aratani et al. | 6,775,174 B2 | 8/2004 | Huffman et al. |
| 6,113,239 | A | 9/2000 | Sampsell et al. | 6,778,155 B2 | 8/2004 | Doherty et al. |
| 6,147,790 | A | 11/2000 | Meier et al. | 6,794,119 B2 | 9/2004 | Miles |
| 6,158,156 | A | 12/2000 | Patrick | 6,809,788 B2 | 10/2004 | Yamada et al. |
| 6,160,833 | A | 12/2000 | Floyd et al. | 6,811,267 B1 | 11/2004 | Allen et al. |
| 6,171,945 | B1 | 1/2001 | Mandal et al. | 6,819,469 B1 | 11/2004 | Koba |
| 6,172,797 | B1 | 1/2001 | Huibers | 6,822,628 B2 | 11/2004 | Dunphy et al. |
| 6,180,428 | B1 | 1/2001 | Peeters et al. | 6,829,132 B2 | 12/2004 | Martin et al. |
| 6,195,196 | B1 | 2/2001 | Kimura et al. | 6,841,081 B2 | 1/2005 | Chang et al. |
| 6,201,633 | B1 | 3/2001 | Peeters et al. | 6,853,129 B1 | 2/2005 | Cummings et al. |
| 6,215,221 | B1 | 4/2001 | Cabuz et al. | 6,855,610 B2 | 2/2005 | Tung et al. |

| | | | | | | |
|---|---|---|---|---|---|---|
| 6,859,218 B1 | 2/2005 | Luman et al. | | 2004/0150939 A1 | 8/2004 | Huff |
| 6,861,277 B1 | 3/2005 | Monroe et al. | | 2004/0160143 A1 | 8/2004 | Shreeve et al. |
| 6,862,022 B2 | 3/2005 | Slupe | | 2004/0174583 A1 | 9/2004 | Chen et al. |
| 6,862,029 B1 | 3/2005 | D'Souza et al. | | 2004/0175577 A1 | 9/2004 | Lin et al. |
| 6,867,896 B2 | 3/2005 | Miles | | 2004/0179281 A1 | 9/2004 | Reboa |
| 6,870,581 B2 | 3/2005 | Li et al. | | 2004/0179445 A1 | 9/2004 | Park et al. |
| 6,870,654 B2 | 3/2005 | Lin et al. | | 2004/0184766 A1 | 9/2004 | Kim et al. |
| 6,882,458 B2 | 4/2005 | Lin et al. | | 2004/0201908 A1 | 10/2004 | Kaneko |
| 6,882,461 B1 | 4/2005 | Tsai et al. | | 2004/0207897 A1 | 10/2004 | Lin |
| 6,891,658 B2 | 5/2005 | Whitehead et al. | | 2004/0209192 A1 | 10/2004 | Lin et al. |
| 6,912,022 B2 | 6/2005 | Lin et al. | | 2004/0209195 A1 | 10/2004 | Lin |
| 6,947,200 B2 | 9/2005 | Huibers | | 2004/0212026 A1 | 10/2004 | Van Brocklin et al. |
| 6,952,303 B2 | 10/2005 | Lin et al. | | 2004/0217378 A1 | 11/2004 | Martin et al. |
| 6,958,847 B2 | 10/2005 | Lin | | 2004/0217919 A1 | 11/2004 | Pichl et al. |
| 6,959,990 B2 | 11/2005 | Penn | | 2004/0218251 A1 | 11/2004 | Piehl et al. |
| 7,008,812 B1 | 3/2006 | Carley | | 2004/0218334 A1 | 11/2004 | Martin et al. |
| 7,053,737 B2 | 5/2006 | Schwartz et al. | | 2004/0218341 A1 | 11/2004 | Martin et al. |
| 7,075,700 B2 | 7/2006 | Muenter | | 2004/0227493 A1 | 11/2004 | Van Brocklin et al. |
| 7,123,216 B1 | 10/2006 | Miles | | 2004/0233503 A1 | 11/2004 | Kimura |
| 7,126,741 B2 | 10/2006 | Wagner et al. | | 2004/0240032 A1 | 12/2004 | Miles |
| 7,236,284 B2 | 6/2007 | Miles | | 2004/0240138 A1 | 12/2004 | Martin et al. |
| 7,301,704 B2 | 11/2007 | Miles | | 2004/0245588 A1 | 12/2004 | Nikkel et al. |
| 2001/0003487 A1 | 6/2001 | Miles | | 2004/0263944 A1 | 12/2004 | Miles et al. |
| 2001/0028503 A1 | 10/2001 | Flanders et al. | | 2005/0001828 A1 | 1/2005 | Martin et al. |
| 2002/0014579 A1 | 2/2002 | Dunfield | | 2005/0002082 A1 | 1/2005 | Miles |
| 2002/0015215 A1 | 2/2002 | Miles | | 2005/0003667 A1 | 1/2005 | Lin et al. |
| 2002/0021485 A1 | 2/2002 | Pilossof | | 2005/0014374 A1 | 1/2005 | Partridge et al. |
| 2002/0024711 A1 | 2/2002 | Miles | | 2005/0024557 A1 | 2/2005 | Lin |
| 2002/0027636 A1 | 3/2002 | Yamada | | 2005/0035699 A1 | 2/2005 | Tsai |
| 2002/0054424 A1 | 5/2002 | Miles | | 2005/0036095 A1 | 2/2005 | Yeh et al. |
| 2002/0075555 A1 | 6/2002 | Miles | | 2005/0036192 A1 | 2/2005 | Lin et al. |
| 2002/0114558 A1 | 8/2002 | Nemirovsky | | 2005/0038950 A1 | 2/2005 | Adelmann |
| 2002/0126364 A1 | 9/2002 | Miles | | 2005/0042117 A1 | 2/2005 | Lin |
| 2002/0139981 A1 | 10/2002 | Young | | 2005/0046922 A1 | 3/2005 | Lin et al. |
| 2002/0146200 A1 | 10/2002 | Kurdle et al. | | 2005/0046948 A1 | 3/2005 | Lin |
| 2002/0149828 A1 | 10/2002 | Miles | | 2005/0057442 A1 | 3/2005 | Way |
| 2002/0149850 A1 | 10/2002 | Heffner et al. | | 2005/0068583 A1 | 3/2005 | Gutkowski et al. |
| 2002/0167072 A1 | 11/2002 | Andosca | | 2005/0068605 A1 | 3/2005 | Tsai |
| 2002/0167730 A1 | 11/2002 | Needham et al. | | 2005/0068606 A1 | 3/2005 | Tsai |
| 2002/0186483 A1 | 12/2002 | Hagelin et al. | | 2005/0069209 A1 | 3/2005 | Damera-Venkata et al. |
| 2003/0015936 A1 | 1/2003 | Yoon et al. | | 2005/0078348 A1 | 4/2005 | Lin |
| 2003/0016428 A1 | 1/2003 | Kato et al. | | 2005/0157364 A1 | 7/2005 | Lin |
| 2003/0029705 A1 | 2/2003 | Qui et al. | | 2005/0168849 A1 | 8/2005 | Lin |
| 2003/0043157 A1 | 3/2003 | Miles | | 2005/0195462 A1 | 9/2005 | Lin |
| 2003/0053078 A1 | 3/2003 | Missey et al. | | 2005/0195467 A1 | 9/2005 | Kothari et al. |
| 2003/0072070 A1 | 4/2003 | Miles | | 2005/0202649 A1 | 9/2005 | Hung et al. |
| 2003/0156315 A1 | 8/2003 | Li et al. | | 2005/0239275 A1 | 10/2005 | Muthukumar et al. |
| 2003/0202264 A1 | 10/2003 | Weber et al. | | 2005/0249966 A1 | 11/2005 | Tung et al. |
| 2003/0202265 A1 | 10/2003 | Reboa et al. | | 2006/0044654 A1 | 3/2006 | Vandorpe et al. |
| 2003/0202266 A1 | 10/2003 | Ring et al. | | 2006/0066640 A1 | 3/2006 | Kothari et al. |
| 2003/0210851 A1 | 11/2003 | Fu et al. | | 2006/0066935 A1 | 3/2006 | Cummings et al. |
| 2004/0008396 A1 | 1/2004 | Stappaerts | | 2006/0067643 A1 | 3/2006 | Chui |
| 2004/0008438 A1 | 1/2004 | Akinobu | | 2006/0077155 A1 | 4/2006 | Chui et al. |
| 2004/0027671 A1 | 2/2004 | Wu et al. | | 2006/0077507 A1 | 4/2006 | Chui et al. |
| 2004/0027701 A1 | 2/2004 | Ishikawa | | 2006/0077508 A1 | 4/2006 | Chui et al. |
| 2004/0051929 A1 | 3/2004 | Sampsell et al. | | 2006/0077515 A1 | 4/2006 | Cummings |
| 2004/0056742 A1 | 3/2004 | Dabbaj | | 2006/0077516 A1 | 4/2006 | Kothari |
| 2004/0058532 A1 | 3/2004 | Miles et al. | | 2006/0077533 A1 | 4/2006 | Miles et al. |
| 2004/0075967 A1 | 4/2004 | Lynch et al. | | 2006/0139723 A9 | 6/2006 | Miles |
| 2004/0080035 A1 | 4/2004 | Delapierre | | 2007/0229936 A1 | 10/2007 | Miles |
| 2004/0080807 A1 | 4/2004 | Chen et al. | | | | |
| 2004/0100594 A1 | 5/2004 | Huibers et al. | | FOREIGN PATENT DOCUMENTS | | |
| 2004/0100680 A1 | 5/2004 | Huibers et al. | | | | |
| 2004/0124483 A1 | 7/2004 | Partridge et al. | | DE | 10228946 A1 | 1/2004 |
| 2004/0125281 A1 | 7/2004 | Lin | | EP | 0 310 176 A2 | 4/1989 |
| 2004/0125347 A1 | 7/2004 | Patel et al. | | EP | 0 361 981 | 4/1990 |
| 2004/0136045 A1 | 7/2004 | Tran | | EP | 0 667 548 A1 | 8/1995 |
| 2004/0140557 A1 | 7/2004 | Sun et al. | | EP | 1484635 | 5/1997 |
| 2004/0145049 A1 | 7/2004 | McKinnell et al. | | EP | 0 788 005 | 8/1997 |
| 2004/0145811 A1 | 7/2004 | Lin et al. | | EP | 1275997 | 1/2003 |
| 2004/0147056 A1 | 7/2004 | McKinnell et al. | | EP | 1 435 336 | 7/2004 |
| 2004/0147198 A1 | 7/2004 | Lin et al. | | EP | 1 473 691 A | 11/2004 |
| 2004/0148009 A1 | 7/2004 | Buzzard et al. | | EP | 1473581 A2 | 11/2004 |

| | | |
|---|---|---|
| FR | 2 824 643 A | 11/2002 |
| JP | 62 082454 | 4/1987 |
| JP | 04-276721 | 10/1992 |
| JP | 05275401 A1 | 10/1993 |
| JP | 11211999 | 8/1999 |
| JP | 11211999 A | 11/1999 |
| JP | 2000306515 A | 11/2000 |
| JP | 2002-062490 | 2/2002 |
| JP | 2002277771 A | 9/2002 |
| JP | 2003195201 A | 7/2003 |
| JP | 2004157527 A | 6/2004 |
| JP | 2004/235465 A | 8/2004 |
| JP | 2004286825 A | 10/2004 |
| JP | 9-127439 | 12/2004 |
| WO | WO9530924 | 11/1995 |
| WO | WO9717628 | 5/1997 |
| WO | WO9952006 A2 | 10/1999 |
| WO | WO9952006 A3 | 10/1999 |
| WO | WO 02/079853 | 10/2002 |
| WO | WO03007049 A1 | 1/2003 |
| WO | WO 03/014789 A2 | 2/2003 |
| WO | WO 03/054925 | 7/2003 |
| WO | WO 03/054925 A | 7/2003 |
| WO | WO 03/069404 | 8/2003 |
| WO | WO 03/069413 A | 8/2003 |
| WO | WO03069413 A1 | 8/2003 |
| WO | WO03073151 A1 | 9/2003 |
| WO | WO03085728 A1 | 10/2003 |
| WO | WO2004006003 A1 | 1/2004 |
| WO | WO2004026757 A2 | 4/2004 |
| WO | WO 2005/006364 A1 | 1/2005 |
| WO | WO 2006/014929 | 2/2006 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K., et al., "Surface micromachined tuneable interferometer array," Sensors and Actuators, pp. 17-23. (1994).

Bass, "Handbook of Optics, vol. I, Fundamentals, Techniques, and Design, Second Edition," McGraw-Hill, Inc., New York, pp. 2.29-2.36 (1995).

Conner, "Hybrid Color Display Using Optical Interference Filter Array," SID Digest, pp. 577-580 (1993).

Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).

Goossen et al., "Possible Display Applications of the Silicon Mechanical Anti-Reflection Switch," Society for Information Display (1994).

Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).

Gosch, "West Germany Grabs the Lead in X-Ray Lithography," Electronics pp. 78-80 (Feb. 5, 1987).

Howard et al., "Nanometer-Scale Fabrication Techniques", VLSI Electronics: Microstruture Science, vol. 5, pp. 145-153 and pp. 166-173 (1982).

Ibbotson et al., "Comparison of XeF2 and F-atom reactions with Si and SiO2," Applied Physics Letters, vol. 44, No. 12, pp. 1129-1131 (Jun. 1984).

Jackson "Classical Electrodynamics", John Wiley & Sons Inc., pp. 568-573. (date unknown).

Jerman et al., "A Miniature Fabry-Perot Interferometer with a Corrugated Silicon Diaphragm Support", (1988).

Johnson "Optical Scanners", Microwave Scanning Antennas, vol. 1, p. 251-261, (1964).

Light over Matter, Circle No. 36 (Jun. 1993).

Miles, Mark, W., "A New Reflective FPD Technology Using Interferometric Modulation", The Proceedings of the Society for Information Display (May 11-16, 1997).

Newsbreaks, "Quantum-trench devices might operate at terahertz frequencies", Laser Focus World (May 1993).

Oliner et al., "Radiating Elements and Mutual Coupling", Microwave Scanning Antennas, vol. 2, pp. 131-141, (1966).

Raley et al., "A Fabry-Perot Microinterferometer for Visible Wavelengths", IEEE Solid-State Sensor and Actuator Workshop, Jun. 1992, Hilton Head, SC.

Schnakenberg, et al. TMAHW Etchants for Silicon Micromachining. 1991 International Conference on Solid State Sensors and Actuators-Digest of Technical Papers. pp. 815-818.

Sperger et al., "High Performance Patterned All-Dielectric Interference Colour Filter for Display Applications", SID Digest, pp. 81-83, (1994).

Stone, "Radiation and Optics, An introduction to the Classical Theory", McGraw-Hill, pp. 340-343, (1963).

Walker, et al., "Electron-beam-tunable interference Filter Spatial Light Modulator", Optics Letters vol. 13, No. 5, pp. 345-347, (May 1988).

Williams, et al. Etch Rates for Micromachining Processing. Journal of Microelectromechanical Systems, vol. 5, No. 4, pp. 256-259, (Dec. 1996).

Winters, et al. The etching of silicon with XeF2 vapor. Applied Physics Letters, vol. 34, No. 1, pp. 70-73, (Jan. 1979).

Winton, John M., "A novel way to capture solar energy", Chemical Week, (May 1985).

Wu, "Design of a Reflective Color LCD Using Optical Interference Reflectors", ASIA Display '95, pp. 929-931, (Oct. 1995).

Butler et al., "An Embedded Overlay Concept for Microsystems Packaging," IEEE Transactions on Advanced Packaging IEEE USA, vol. 23, No. 4, pp. 617-622, XP002379648 (2000).

Chiou et al., "A Novel Capacitance Control Design of Tunable Capacitor Using Multiple Electrostatic Driving Electrodes," IEEE NANO 2001, M 3.1, Nanoelectronics and Giga-Scale Systems (Special Session), Oct. 29, 2001, pp. 319-324.

Chunjun Wang et al., "Flexible curcuit-based RF MEMS Switches," MEMS. XP002379649 pp. 757-762, (Nov. 2001).

Goossen, "MEMS-based variable optical interference devices," Optical MEMS, 2000 IEEE/LEDS Int'l. Conf. on Aug. 21-24, 2000, Piscataway, NJ, Aug. 21, 2000, pp. 17-18.

Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. Conf. 6, Jun. 24, 1991, pp. 372-375.

Joannopoulos et al., "Molding the Flow of Light," Photonic Crystals. 1995.

Nagami et al., "Plastic Cell Architecture: Towards Reconfigurable Computing for General-Purpose," Proc. IEEE Workshop on FPGA-based Custom Computing Machines, (1998).

Peerlings et al., "Long Resonator Micromachined Tuneable GaAs-AlAs Fabry-Perot Filter," IEEE Photonics Technology Letters, IEEE Service Center, Piscataway, NJ, vol. 9, No. 9, Sep. 1997, pp. 1235-1237.

Wu et al., "MEMS Designed for Tunable Capacitors," Microwave Symposium Digest, 1998 IEEE MTT-S Int'l., Baltimore, MD, Jun. 7-12, 1998, vol. 1, pp. 127-129.

Zhou et al.,"Waveguide Panel Display Using Electromechanical Spatial Modulators," SID Digest, vol. XXIX, 1998.

International Search Report and Written Opinion of the International Searching Authority for PCT/US2005/005919 dated Aug. 24, 2005.

International Search Report Application No. PCT/US2005/026448, Dated Nov. 23, 2005.

International Search Report Application No. PCT/US2005/029820, Dated Dec. 27, 2005.

International Search Report Application No. PCT/US2005/030962, Dated Aug. 31, 2005.

International Search Report Application No. PCT/US2005/034465, Dated Sep. 23, 2005.

European Search Report Application No. 05255693.2-2217, dated May 24, 2006.

European Search Report Application No. EP 05 25 5673 in 9 pages, dated Jan. 23, 2006.
Austrian Search Report No. 162/2005, Dated Jul. 14, 2005.
Austrian Search Report No. 164/2005, Dated Jul. 4, 2005.
Austrian Search Report No. 140/2005, Dated Jul. 15, 2005.
Austrian Search Report No. 161/2005, Dated Jul. 15, 2005.
Austrian Search Report No. 150/2005, Dated Jul. 29, 2005.
Austrian Search Report No. 144/2005, Dated Aug. 11, 2005.
Austrian Search Report No. 66/2005, Dated May 9, 2005.
Fan et al., "Channel Drop Filters in Photonic Crystals," Optics Express, vol. 3, No. 1, 1998.
Kim et al., "Control of Optical Transmission Through metals Perforated With Subwave-Length Hole Arrays," Optic Letters, vol. 24, No. 4, Feb. 15, 1999, pp. 256-257.
Lin et al., "Free-Space Michromachined Optical Switches for Optical Networking," IEEE Journal of Selected Topics in Quantum Electronics, vol. 5, No. 1m Jan./Feb. 1999, pp. 4-9.
Little et al., "Vertically Coupled Microring Resonator Channel Dropping Filter," IEEE Photonics Technology Letters, vol. 11, No. 2, 1999.
Magel, "Integrated Optic Devices Using Micromachined Metal Membranes," SPIE vol. 2686, 0-8194-2060-Mar. 1996.
Science and Technology, The Economist, May 22, 1999, pp. 89-90.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Release | Actuate |
| $-\Delta V$ | Actuate | Release |

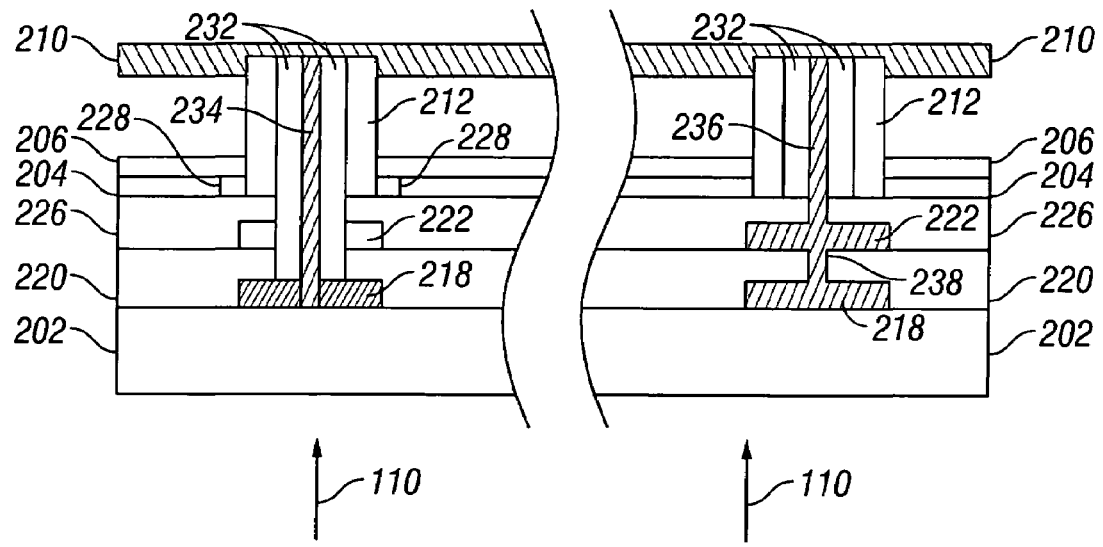
FIG. 20    FIG. 21
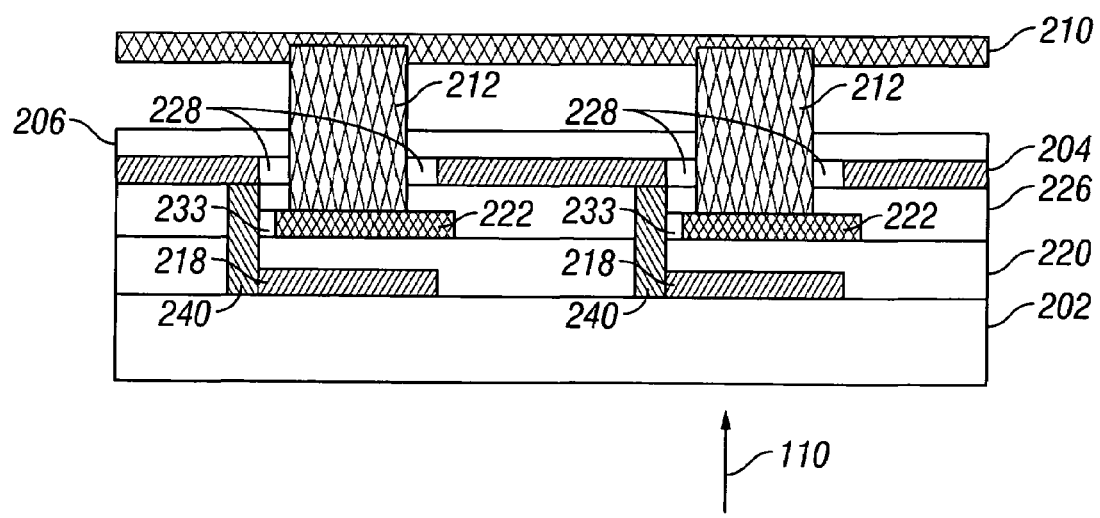
FIG. 22

US 7,420,725 B2

DEVICE HAVING A CONDUCTIVE LIGHT ABSORBING MASK AND METHOD FOR FABRICATING SAME

CROSS REFERENCE TO RELATED APPLICATIONS

This application claims priority to U.S. Provisional Application No. 60/613,480, titled "DEVICE HAVING A CONDUCTIVE LIGHT ABSORBING MASK AND METHOD FOR FABRICATING SAME," filed Sep. 27, 2004, which is incorporated by reference, in its entirety. This application is related to U.S. Pat. No. 6,741,377 entitled "Device Having a Light-Absorbing Mask and a Method for Fabricating Same," filed Jul. 2, 2002, which is assigned to the assignee of the present invention.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

A first embodiment includes an optical device including a substrate, an optical element disposed on the substrate, the optical element having an optical characteristic which changes in response to a voltage applied to the optical element, and a light-absorbing, electrically-conductive optical mask disposed on the substrate and at a location that is at least partially different than that of the optical element, the optical mask electrically coupled to the optical element to provide one or more electrical paths for application of voltages to the optical element. In one aspect of this embodiment, the optical element comprises an interferometric modulator. In a second aspect of this embodiment, the optical mask is configured to appear black. In a third aspect of this embodiment, the optical mask is configured to appear a color other than black. In a fourth aspect of this embodiment, the device further includes a column electrode electrically coupled to the mask to form an electrically parallel connection. In a fifth aspect of this embodiment, the device further includes a row electrode electrically coupled to the mask to form an electrically parallel connection. In a sixth aspect of this embodiment, the mask comprises a film stack. In a seventh aspect of this embodiment, the mask is electrically coupled to the optical element by one or more conductive vias. In an eighth embodiment, the film stack comprises a first reflective layer and a second reflective layer, and the first reflective layer can be electrically connected to a first electrode and the second reflective layer can be electrically connected to a second electrode. In a ninth embodiment, the first reflective layer and the second reflective layer are electrically connected to the same electrode.

A second embodiment includes a method of providing an electrical signal to a plurality of optical elements of a display, the optical elements individually actuatable by applying a voltage thereto, the method includes electrically coupling an electrically-conductive, light-absorbing mask to one or more optical elements, and applying a voltage to the mask to activate the one or more optical elements. In one aspect of this embodiment, the optical elements comprise interferometric modulators. In a second aspect of this embodiment, the mask comprises a film stack. In a third aspect of this embodiment the mask comprises one or more interferometric modulators. In a fourth aspect of this embodiment, one or more of the interferometric modulators included in the mask are static interferometric modulators. In a fifth aspect of this embodiment, the mask comprises a film stack.

A third embodiment includes a method of fabricating an optical device, the method including forming an electrically-conductive optical mask on a substrate, wherein the optical mask absorbs light, forming an optical component on the substrate in a location that is at least partially different than that of the optical mask, wherein the optical component has a driven state and an undriven state, the optical component changing between the driven state and the undriven state in response to an applied voltage, each state having a characteristic optical response to incident light, and electrically connecting the optical mask to the optical component so at least a portion of the optical mask provides a bus for applying the voltage to the optical component. In one aspect of this embodiment, the optical component comprises an interferometric modulator. In a second aspect of this embodiment, the optical mask comprises one or more interferometric modulators. In a third aspect of this embodiment, one or more interferometric modulators are static. In a fourth aspect of this embodiment, the optical mask comprises a film stack. In a fifth aspect of this embodiment, the film stack comprises a non-light-absorbing dielectric material sandwiched between two light-reflecting materials. In a sixth aspect of this embodiment, one or more of the light-reflecting materials comprises silver, aluminum, or chromium.

A fourth embodiment includes a method of fabricating an optical device comprising at least one active optical component formed on a transparent substrate, the method including identifying an area on the substrate that is to be light-absorbing wherein the identified area is laterally offset from the at least one active optical component, and fabricating a conductive light-absorbing mask on the identified area prior to fabricating the at least one active optical component, wherein the mask is connected to the active optical component. In one aspect of this embodiment, the optical component comprises a pixel, the light-absorbing area being an area bordering the pixel. In a second aspect of this embodiment, the fabricating further includes depositing a first light-reflecting layer on the substrate, depositing a non-light-absorbing dielectric layer on the first light-reflecting layer, and depositing a second light-reflecting layer on the non-light absorbing dielectric layer, wherein one or more of the first or second light-reflecting layer is electrically conductive. In a third aspect of this embodiment, the first and second light-reflecting layers comprise metallic materials. In a fourth aspect of this embodiment, the non-light absorbing dielectric layer comprises an oxide layer. In a fifth aspect of this embodiment, the pixel is defined by an interferometric modulator. In a sixth aspect of this embodiment, the light-absorbing mask comprises a static interferometric modulator.

A fifth embodiment includes an optical device including means for reflecting incident light from an optical component, wherein the optical component has a driven state and an undriven state, the optical component changing between the driven state and the undriven state in response to an applied voltage, each state having a characteristic optical response to incident light, means for absorbing light in an electrically-conductive optical mask disposed on the substrate and at a location that is at least partially different than that of the optical component, and means for electrically connecting the optical mask to the optical component so at least a portion of the optical mask provides an electrical bus for a voltage applied to the optical component.

A sixth embodiment includes an optical device produced by the process including identifying an area on the substrate that is to be light-absorbing wherein the identified area is laterally offset from the at least one active optical component, and fabricating a conductive light-absorbing mask on the identified area prior to fabricating the at least one active optical component, wherein the mask is connected to the active optical component.

BRIEF DESCRIPTION OF THE DRAWINGS

FIG. 20 is a cross-sectional view of a MEMS device illustrating an embodiment of a conductive mask where an electrically parallel connection is formed between a first reflective layer of the mask and a movable mechanical membrane.

FIG. 21 is a cross-sectional view of a MEMS device illustrating an embodiment of a conductive mask where an electrically parallel connection is formed between a first and second reflective layer of the mask and a movable mechanical membrane.

FIG. 22 is a cross-sectional view of a MEMS device illustrating an embodiment of a conductive mask where an electrically parallel connection is formed between a first reflective layer of the mask and a non-movable electrode layer and another electrically parallel connection is formed between a second reflective layer of the mask and a movable mechanical membrane.

DETAILED DESCRIPTION OF CERTAIN EMBODIMENTS

Figure 1:
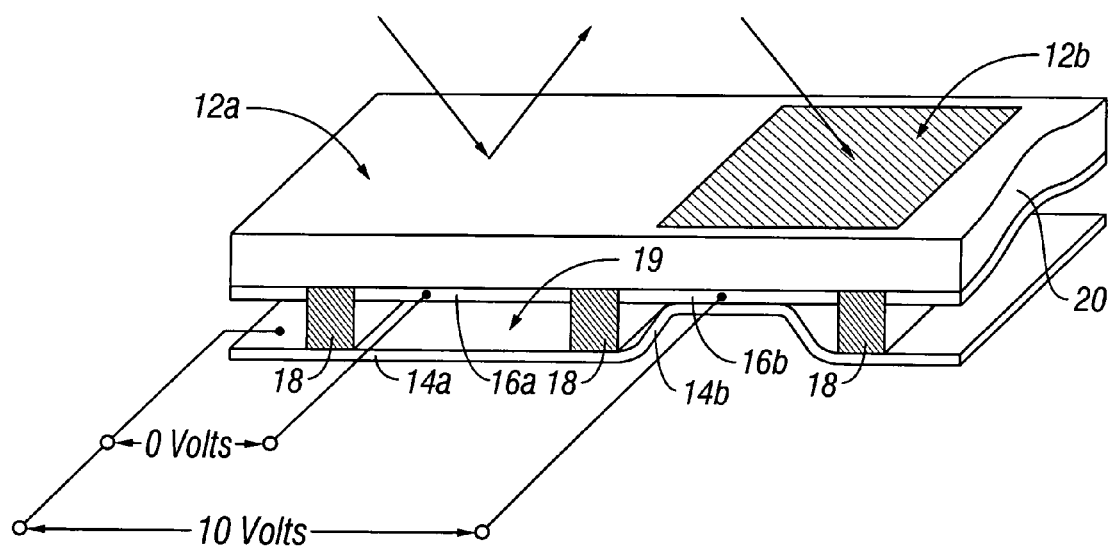
FIG. 1 is an isometric view depicting a portion of one embodiment of an interferometric modulator display in which a movable reflective layer of a first interferometric modulator is in a released position and a movable reflective layer of a second interferometric modulator is in an actuated position.

The following detailed description is directed to certain specific embodiments of the invention. In this description, reference is made to the drawings wherein like parts are designated with like numerals throughout.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The desire to view video data on high resolution mobile device displays while meeting power limitations is facilitated by minimizing the resistance of the display control lines. For these and other reasons, it is desirable to increase the conductance of the signal lines while minimizing the amount of additional passive or non-active optical contents in a display. The present invention discloses, in one embodiment, a multi-purpose optical component that acts as an conductive optical mask, e.g., a "black mask," to absorb ambient or stray light and to improve the optical response of a display device by increasing the contrast ratio, and to also function as an electrical bussing layer. In some applications, the conductive mask can reflect light of a predetermined wavelength to appear as a color other than black. The conductive mask, also referred to herein simply as a "mask," can be electrically coupled to one or more of the elements on the display to provide one or more electrical paths for voltages applied to one or more of the display elements. For example, depending on the configuration desired, one or more of the row or column electrodes can be connected to the conductive mask to reduce the resistance of the connected row or column electrode. In one embodiment, a MEMS display device, for example, an array of interferometric modulators, comprises a dynamic optical component (e.g., a dynamic interferometric modulator) and a static optical component (e.g., a static interferometric modulator) laterally offset from the dynamic optical component. The static optical component functions as the "black mask" to absorb ambient or stray light in non-active areas of a display to improve the optical response of the dynamic optical component, and acts as an electrical bus for either a row or a column electrode of the array of interferometric modulators. For example, non-active areas can include one or more areas of a MEMS display device other than the area corresponding to a movable reflective layer. A non-active areas can also include an area of a display device that is not used to display an image or data rendered on the display device.

Although a MEMS device, which includes an interferometric modulator, will be used to illustrate one embodiment, it is to be understood that the invention covers other optical devices such as various imaging display and optoelectronic devices in general, which have non-active areas which are required to be light-absorbing, but which do not include interferometric modulators (e.g., LED and plasma displays). As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of supports 18 and an intervening sacrificial material deposited between the supports 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
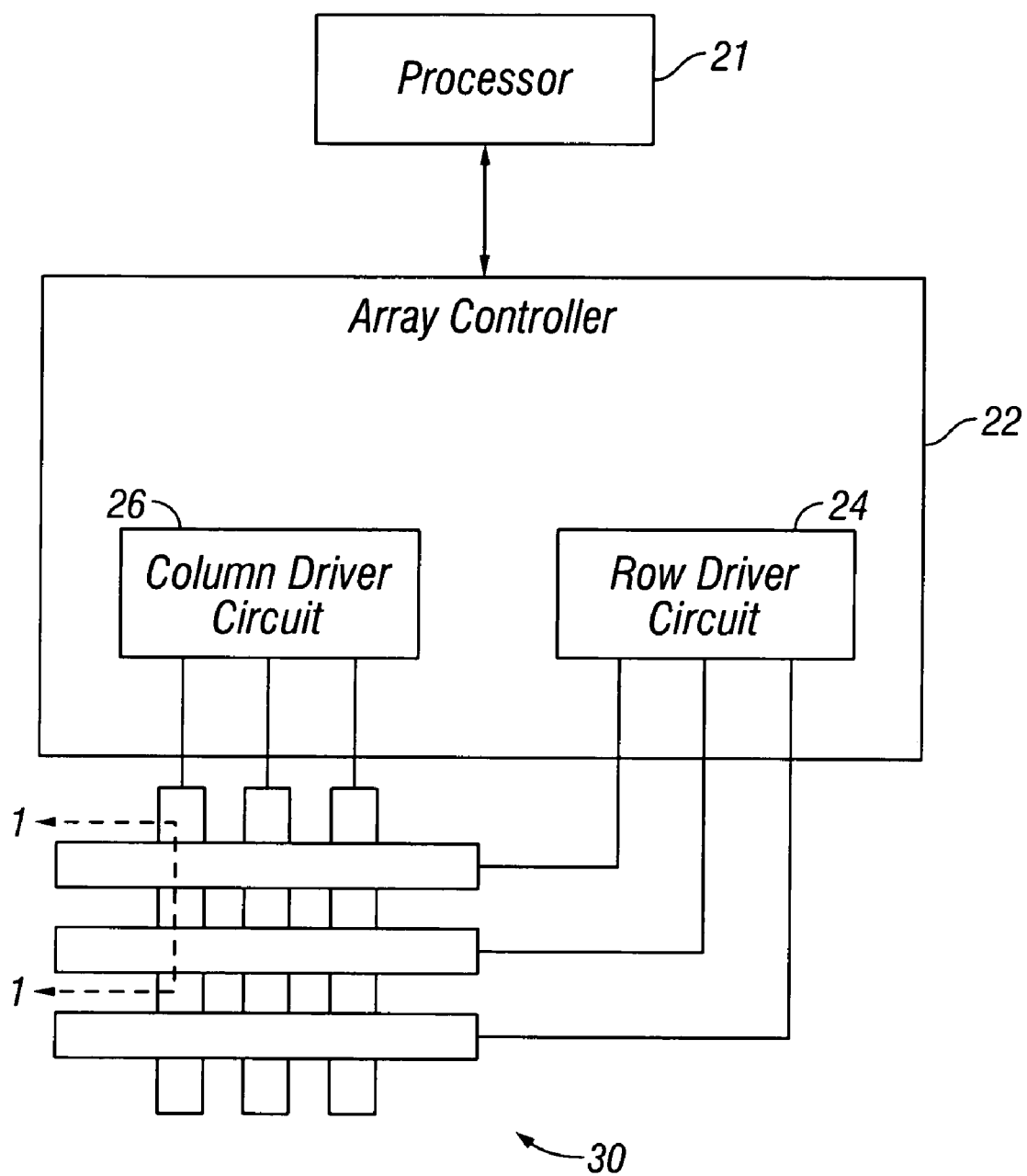
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
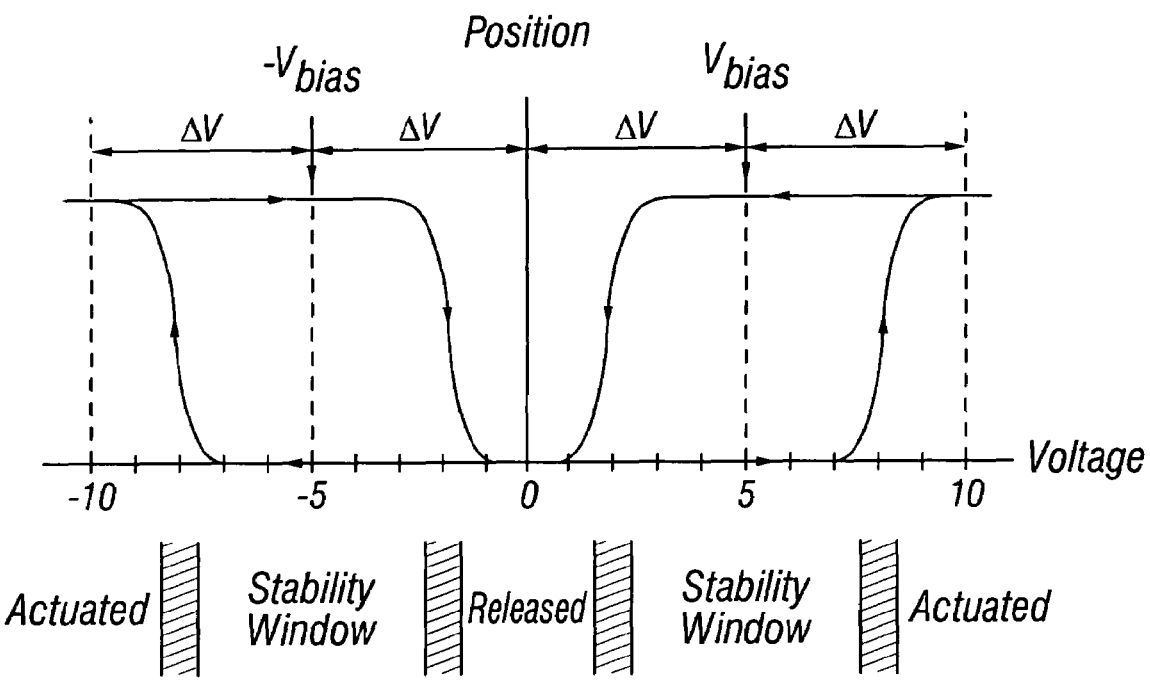
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
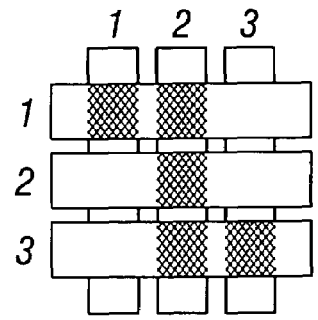
FIGS. 5A and 5B illustrate one exemplary timing diagram for row and column signals that may be used to write a frame of display data to the 3×3 interferometric modulator display of FIG. 2.
Figure 5B:
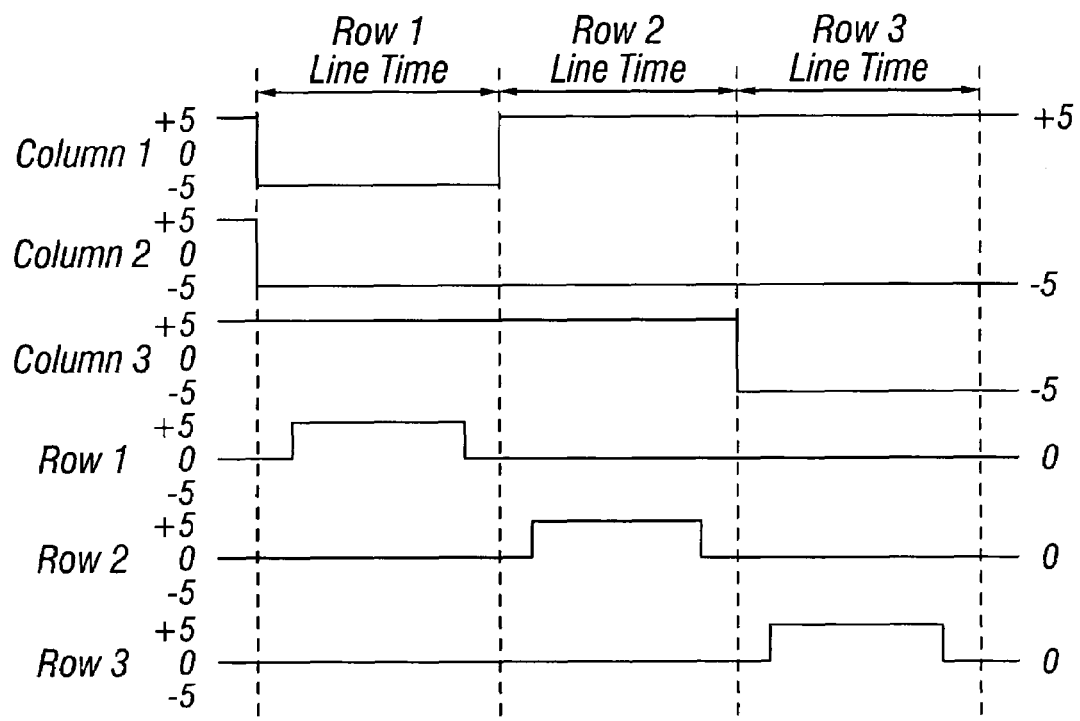

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
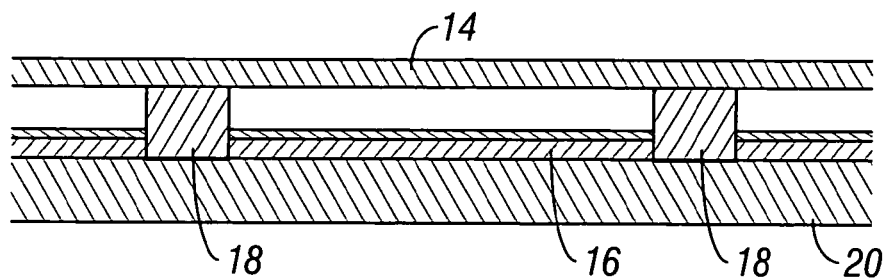
FIG. 6A is a cross section of the device of FIG. 1.
Figure 6B:
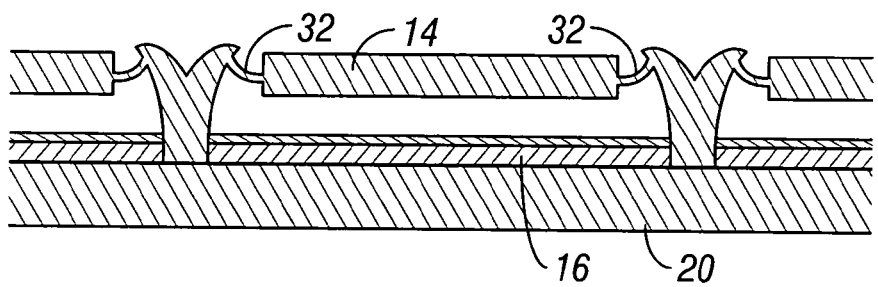
FIG. 6B is a cross section of an alternative embodiment of an interferometric modulator.
Figure 6C:
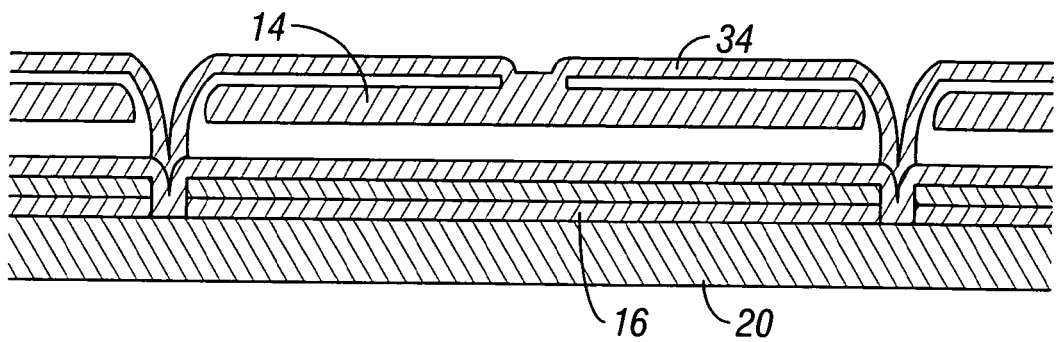
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Figure 7A:
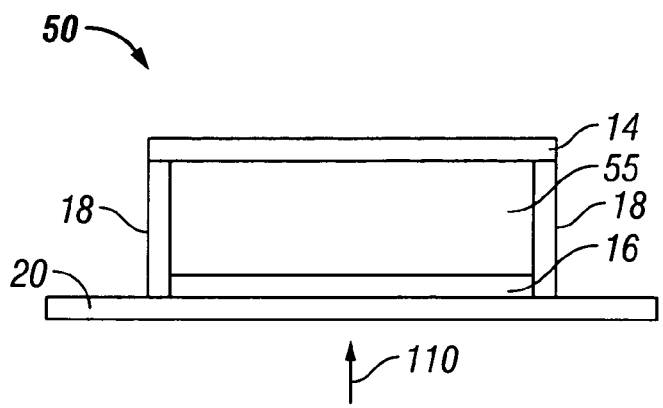
FIG. 7A is a cross-sectional side elevational view of a first exemplary interferometric modulator in a first state.

FIGS. 7A-7D illustrate certain aspects of the two interferometric modulator structures described above. FIG. 7A illustrates a simplified functional diagram of an interferometric modulator 50 in one exemplary embodiment. The interferometric modulator 50 comprises a substrate 20, an optical dielectric 16 upon the substrate 20, two supports 18 and a mirror 14 connected to the supports 18 so as to orient its face in a plane that is parallel to and laterally aligned with the plane of an upper face of the dielectric 16. The mirror 14 in FIG. 7A is shown in a mechanically relaxed first state so that it reflects incident light when the interferometric modulator is seen, e.g., from a viewing position 110. The distance between the optical dielectric 16 and the mirror 14 is tuned such that only light at a selected wavelength is reflected. The details of the method of selecting the geometries and materials are described in detail in the aforementioned U.S. Pat. No. 5,835,255 and the aforementioned U.S. patent application Ser. No. 09/966,843, now U.S. Pat. No. 6,867,896. In FIG. 7A, the supports 18, mirror 14, and optical dielectric 16 define an optical cavity 55.

Figure 7B:
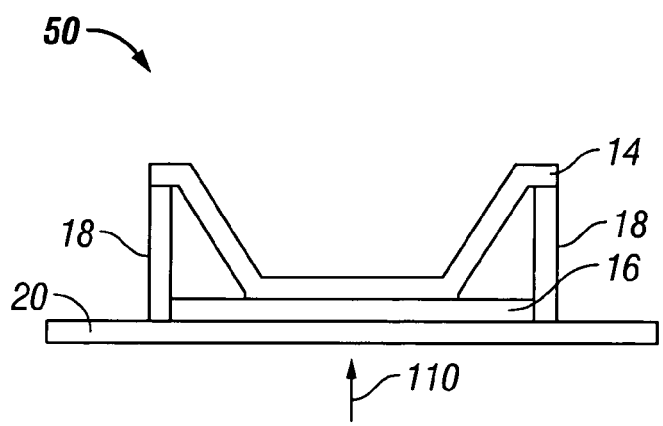
FIG. 7B is a cross-sectional side elevational view of the interferometric modulator of FIG. 7A in a second state.

FIG. 7B illustrates a simplified functional diagram of the interferometric modulator 50 shown in FIG. 6A where the mirror 14 is in a second state. In FIG. 7B, the mirror 14 is moved towards the optical dielectric layer 16 collapsing the optical cavity 55. The mirror 14 is moved by providing a voltage potential between electrodes coupled to the mirror 14 and the optical dielectric 16. By moving the mirror 14 to a second state that is in contact with or in close proximity to the optical dielectric 16, the optical properties of the interferometric modulator 50 in the second state are altered from the first state. Light reflected from the interferometric modulator 50 in the second state (FIG. 7B) is a different color than light reflected from the interferometric modulator 50 in the first state. In one configuration, in the second state the interference of the light is such so that from the viewing position 110 the interferometric modulator appears black.

Figure 7C:
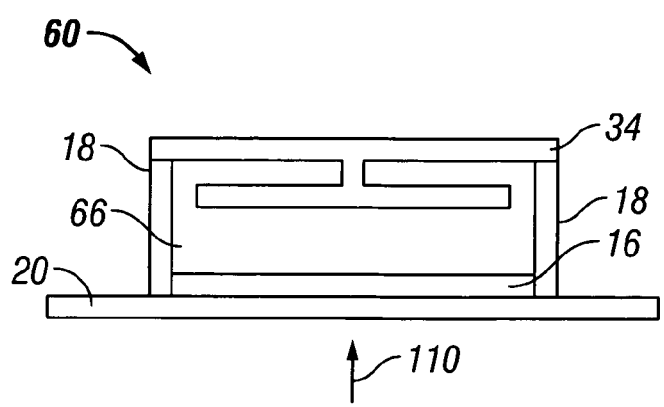
FIG. 7C is a cross-sectional side elevational view of second exemplary interferometric modulator in a first state.
Figure 7D:
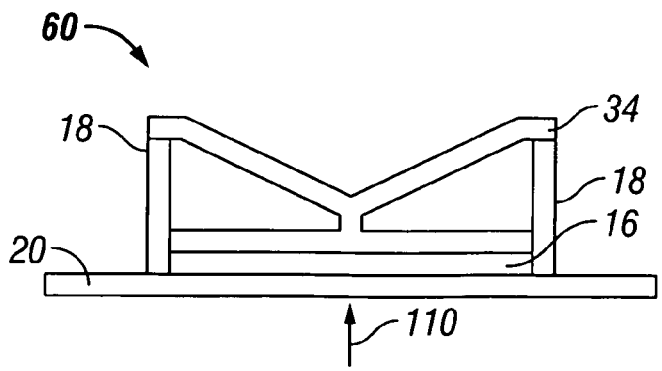
FIG. 7D is a cross-sectional side elevational view of the interferometric modulator of FIG. 7C in a second state.

FIGS. 7C and 7D illustrate another embodiment of an interferometric modulator 60 in a first "open" and a second "closed" state, respectively. This embodiment of the interferometric modulator 60 provides an increased usable mirror size as compared to the embodiment shown in FIGS. 7A and 7B. Referring back to FIG. 7B, there are areas of the mirror 14 which are not providing maximum reflectivity towards viewing position 110 because they are bending into the collapsed optical cavity 55. Comparing the mirror 34 in FIG. 7D to the mirror 14 in FIG. 7B, it can be seen that the mirror 34 in FIG. 7D occupies substantially the entire area corresponding to surface area of the optical dielectric 16 in the optical cavity 66. In the embodiment shown in FIG. 7D, the reflecting surface of the mirror 34 can be used for the reflection of light because it is not needed to bend the mirror into the collapsed optical cavity 66 when the interferometric modulator 60 is actuated. In FIGS. 7C and 7D, the substrate optical dielectric 16, two supports 18 and the substrate 20 remain unchanged from the interferometric modulator 50 shown in FIGS. 7A and 7B. Details of the structure and fabrication of this improved structure can be found in the aforementioned U.S. patent application Ser. No. 09/966,843.

Figure 8A:
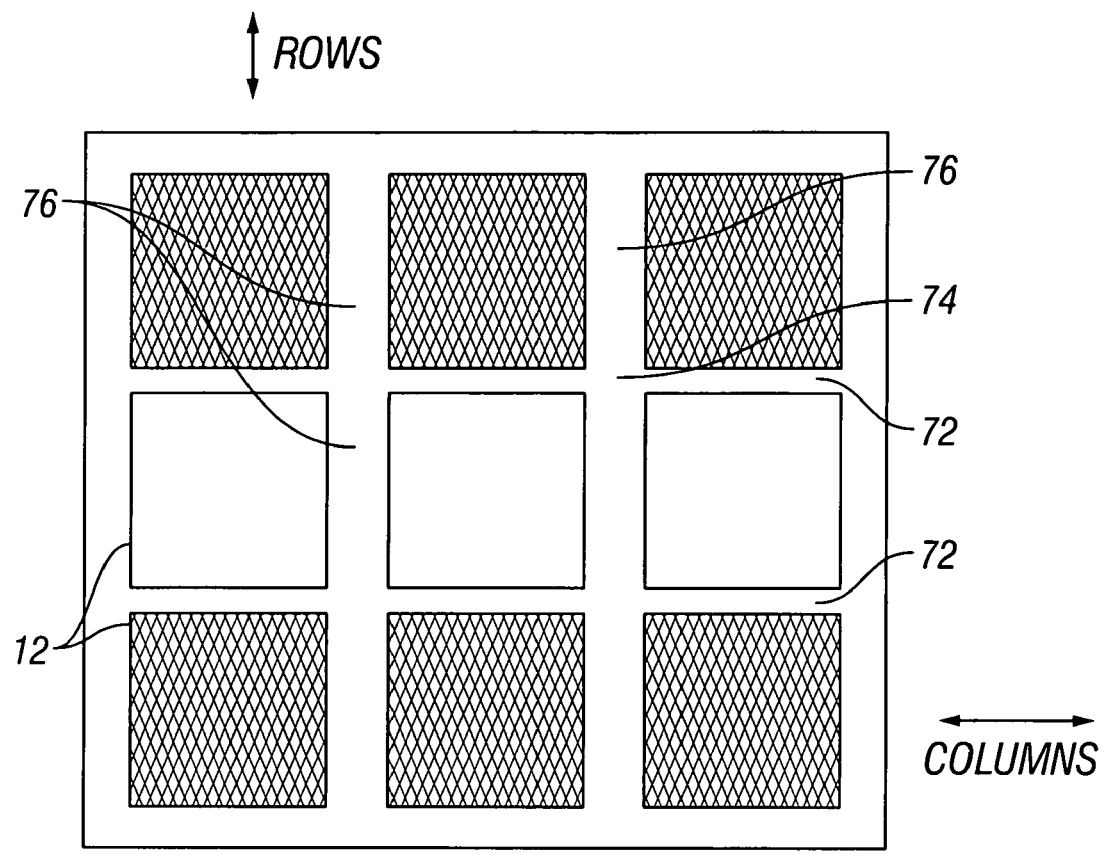
FIG. 8A is a top view of a portion of an interferometric modulator array illustrating non-active areas containing structures included in a plurality of pixels.
Figure 8B:
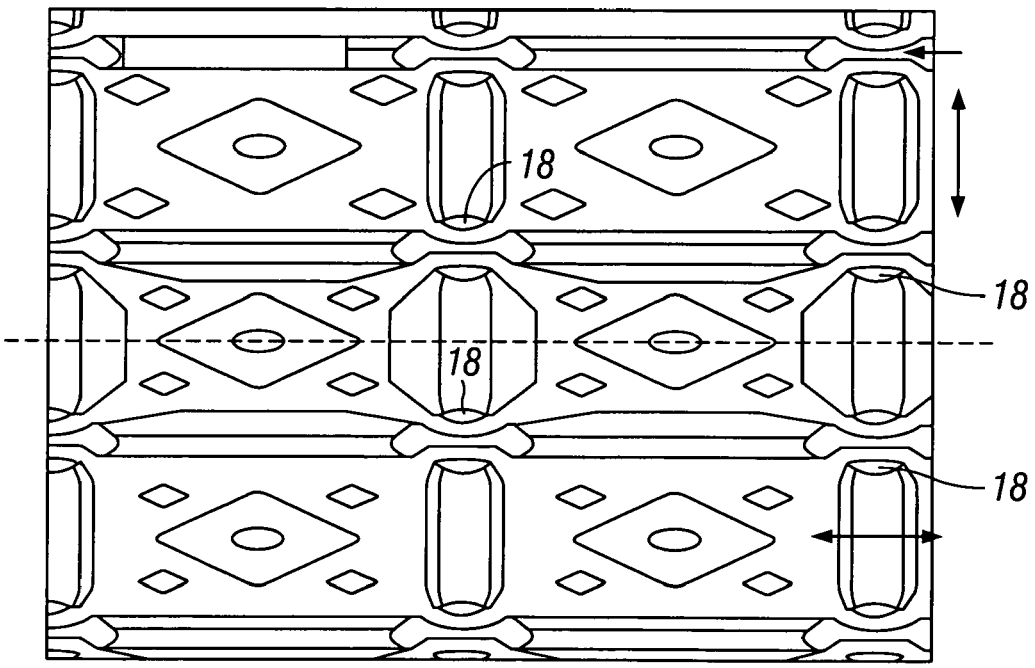
FIG. 8B is a top elevational view of a portion of an interferometric modulator array illustrating non-active areas containing structures included in a plurality of pixels.

FIGS. 8A and 8B illustrate an example of a portion of a display with display elements that can incorporate a conductive mask. FIGS. 8A and 8B illustrate an exemplary portion of a display that includes an array of interferometric modulators. A conductive mask can be used in the array shown in FIGS. 8A and 8B, and in any type of display where it is useful to mask off certain areas of the display from ambient light and form an electrically parallel connection of an electrical circuit in the display. FIG. 8A shows a plurality of pixels 12 of the array. FIG. 8B shows an example of supports 18 located on the plurality of pixels of the array of interferometric modulators that can be masked to improve the optical response of the display. To improve an optical response (e.g., contrast) of the display, it can be desirable to minimize light reflected from certain areas of the array. Any area of an interferometric modulator that increases the reflectance of the display in the dark state can be masked off (e.g., disposing a mask between the structure and light entering the interferometric modulator) using a black mask in order to increase the contrast ratio between an actuated pixel and an unactuated pixel. Some of the areas that can be masked to advantageously affect the display include, but are not limited to, row cuts between interferometric modulators 72 (FIG. 8A), the supports 18, bending areas of the movable mirror layers connecting to and/or around the supports 18, and areas between movable mirror layers of adjacent interferometric modulators 76 (FIG. 8A). The mask can be disposed in such areas so that it is spaced apart from the movable mirror of the interferometric modulators, e.g., so that ambient light can propagate to and reflect from the movable mirror but the areas other than the movable mirror are masked inhibiting ambient light from reflecting from any structures in the masked areas. These areas that are masked can be referred to as "non-active areas" because they are static, e.g., the areas do not include the movable mirror. In some embodiment, the mask can be conductive to minimize reflected light and provide one or more electrical paths that can be used for the optical element. In some embodiments, the mask can be disposed so that light entering the interferometric modulator falls onto either the masked area or the movable mirror. In other embodiments, at least a portion of the non-active areas are masked.

The rate at which display elements can respond to drive signals can depend on the resistance and capacitance of the control lines (e.g., row and column electrodes) carrying the drive signals to the display elements. The desire to view video on large displays and for high resolution displays demands that the resistance of the control lines be minimized. For these reasons, it is desirable to increase the conductance of the signal lines while minimizing the amount of additional passive optical contents in a display. One way to decrease the resistance is to provide one or more electrically parallel connections to the control lines. A dual-purpose mask can be provided that increases contrast ratio, and at the same time, acts as a bussing layer for the driving signals. For example, in one embodiment the conductive mask can be used to form an electrically parallel connection to one or more row or column electrodes of an array of display elements, for example, interferometric modulators. It will be appreciated that the electrically parallel connections can be can be designed in many ways, depending on the application and the type of display elements.

Figure 9:
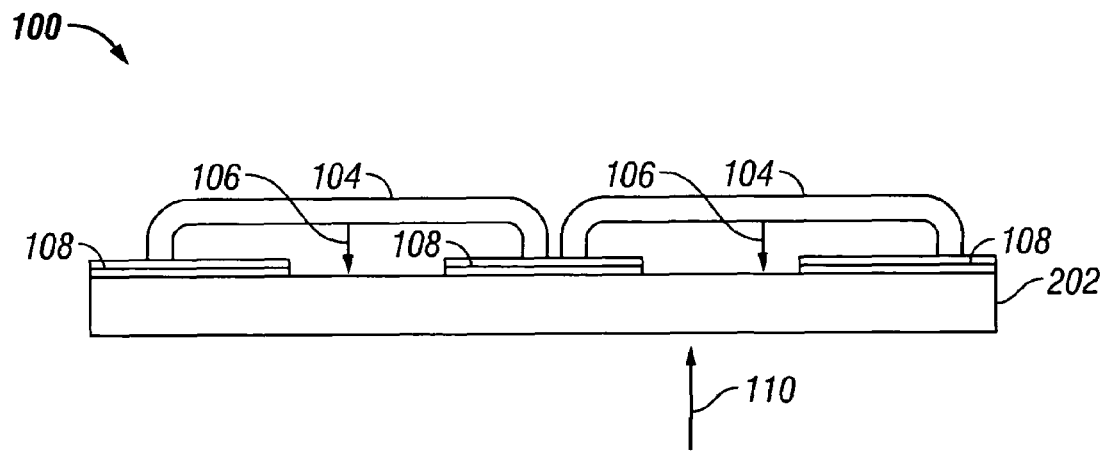
FIG. 9 shows a cross-section through a MEMS device having a mask or light-absorbing region in accordance with one embodiment of the invention.

FIG. 9 shows a cross-sectional view of a simplified representation of a display 100, according to one embodiment. The display comprises two optical components which are, in this embodiment, interferometric modulators 104. As described above, interferometric modulator devices 104 comprise an arrangement of reflective films that produce a desired optical response when the movable active area is driven towards a substrate 202 in a direction indicated by arrows 106. The general operation of the interferometric modulator devices 104 has been described in U.S. Pat. No. 5,835,255. In FIG. 9, reference numerals 108 indicate non-active areas of the interferometric modulators 104. Typically, it is desirable that the non-active areas 108 be light-absorbing or to function as a black mask so that when a viewer looks at the display 100 from a direction indicated by the viewing arrow 110, the optical response produced by the interferometric modulator devices 104 is not degraded by the reflection of ambient light from the non-active areas 108. In other embodiments, it can be desirable to mask the non-active areas 108 with a colored mask (for example, green, red, blue, yellow, etc.) other than black. To gain additional functionality from the mask, the mask can comprise one or more conductive materials which can be connected to circuitry in the display 100 and used in whole or in part to provide one or more electrical busses.

A mask for a non-active area 108 may be fabricated from materials selected to have an optical response which absorbs or attenuates light. One or more of the materials used to fabricate the mask are electrically conductive. According to embodiments of the invention, a mask for each non-active area 108 can be fabricated as a stack of thin films. For example, in one embodiment, the stack of thin films may comprise a non-light-absorbing dielectric layer sandwiched between two light reflecting chrome layers, as will be more fully described below. In other embodiments, the non-active areas 108 may comprise a single layer of organic or inorganic materials which attenuates or absorbs light, and a layer of a conductive material such as chrome or aluminum.

Figure 10:
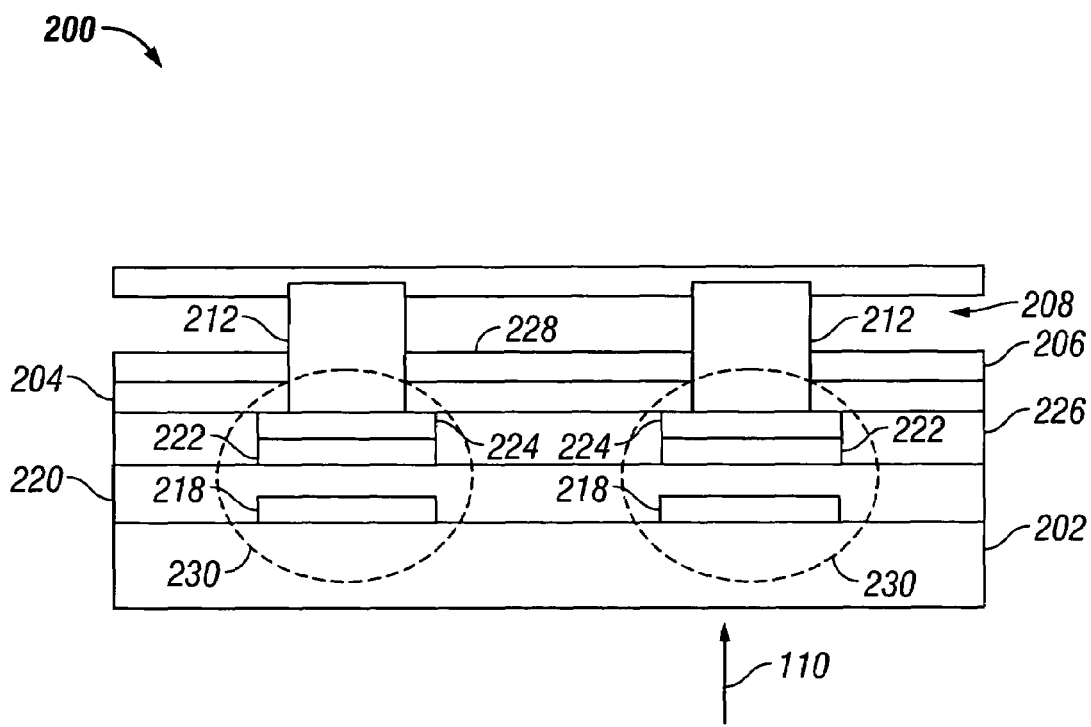
FIG. 10 shows a cross-section of another embodiment of a MEMS device having a mask or light-absorbing region in accordance with another embodiment of the invention.

FIG. 10 of the drawings shows a cross section through an interferometric modulator device 200 in accordance with one embodiment of the invention. The interferometric modulator device 200 includes an active component comprising an electrode reflective layer 204, an oxide layer 206, an air gap 208, and a mechanical membrane 210 disposed on a substrate 202. As used herein, the phrase "disposed on a substrate" is a broad phrase, and it indicates, for example that a referenced structure, layer, optical device, interferometric modulator, bi-stable device, electrode, film stack, support, electrode, mask or other referred to feature is located on a substrate, and can but does not necessarily require direct contact with the substrate, unless so indicated. The mechanical membrane 210 is supported in position by supports 212. In use, the mechanical membrane 210 is driven to contact the oxide layer 206 to produce a desired optical response when viewed from the direction indicated by arrow 110.

The supports 212, the areas of the interferometric modulator 200 on which the supports 212 are formed, and other areas that are not part of the active component of the interferometric modulator (for example, areas indicated by encircled areas 230) can be masked with a conductive mask to prevent or reduce the reflection of light from these areas which can otherwise interfere with the desired optical response of the active interferometric modulator components. The mask can be fabricated as a stack of films, including at least one electrically conducting film, selected so that the stack has the optical property of being light-absorbing and conductive, according to one embodiment. The mask can be formed on the substrate 202 prior to forming the active optical components of the interferometric modulators, according to one embodiment. The supports 212 of the interferometric modulator 200 can perform several functions. First, the supports 212 function as mechanical supports for the movable mechanical membrane 210. Second, the supports 212 can provide an electrical connection for the conductive mask, if the supports 212 comprise an electrically conductive material. For example, when a support 212 is connected to a conductive layer 222 the support 212 and the conductive layer 222 can provide one or more electrical paths to apply voltages to the movable mechanical membrane 210, as will be illustrated in following FIGS. 17-18, and 20-22.

As shown in FIG. 10 the interferometric modulator 200 includes a conductive mask that comprises a stack of thin films. In one embodiment, the mask comprises a first reflective chrome layer 218, an oxide middle layer 220 and a second reflective chrome layer 222. Other conductive materials can also be used to form the mask. For example, in another embodiment, the mask includes a stack of thin films comprising a chrome layer 218, an oxide middle layer 220 (for example, $SiO_2$), and an aluminum layer 222. The interferometric modulator 200 includes another oxide layer 226 between the oxide middle layer 220 and the electrode reflective layer 204. One or more electrically conductive layers of the mask can be connected other components of the interferometric modulator 200 to provide an electrical bus. For example, the mask can be connected to one or more column or row electrodes. In one embodiment, chrome layer 222 is connected to the electrode reflective layer 204 by vias 224 that comprise an electrically conductive material. The connections required in the configuration of the conductive mask so that it functions as an electrical bus can depend on the particular application. In some embodiments, the electrode reflective layer 204 includes electrical separators 228 (for example, gaps or non-conductive material) located in various positions to electrically separate conductive portions of the interferometric modulator, for example, the electrode reflective layer 204 or the supports 212, and suitably configure the mask to exhibit the desired bus functionality.

Figure 11:
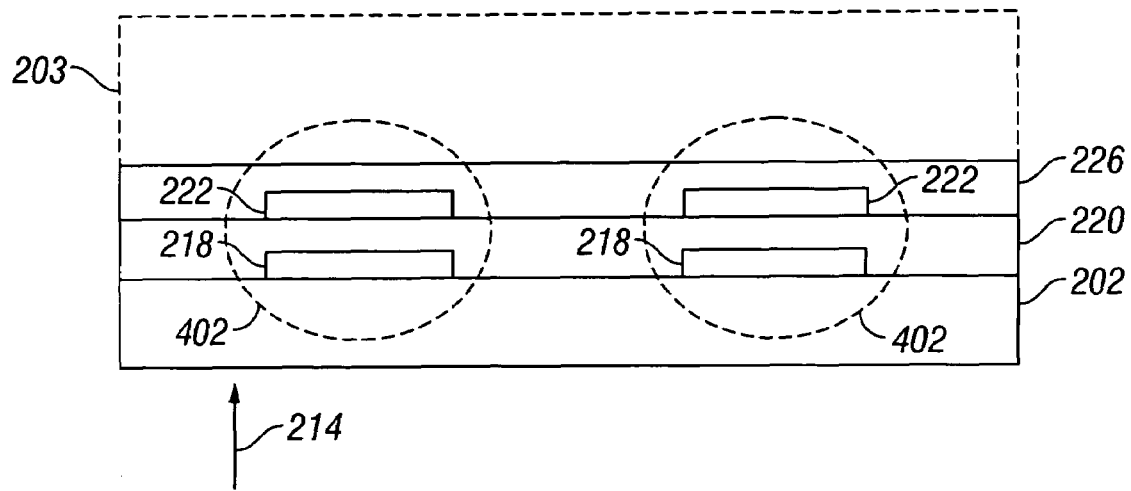
FIG. 11 is a cross-sectional view illustrating various layers that can be included in a MEMS device having a conductive mask.

One embodiment of fabricating a conductive mask is disclosed below in reference to FIGS. 11-17. FIG. 11 is a cross-sectional view illustrating various layers that can be included in a MEMS device, for example the MEMS device shown in FIG. 1, having a conductive mask 402. Only a portion of the MEMS device that includes the conductive mask 402 is shown in FIG. 11, the remaining portion of the MEMS device being indicated by the dashed rectangle 203. The conductive mask 402, indicated by the dashed circles, is illustrated as being fabricated on a substrate 202. The mask 402 comprises three layers of film, including a first reflective layer 218, an oxide layer 220 and a second reflective layer 222. The first reflective layer 218 and the second reflective layer 222 can comprise materials that are both reflective and conductive, for example, chrome, aluminum, or silver. For some embodiments, the conductive mask 402 can be structured as an static interferometric modulator that is configured so that it minimizes reflected light, e.g., appears black. In other embodiments, the conductive mask 402 can be structured as a static interferometric modulator that reflects light of a selected color. The films which make up the conductive mask 402 can be the same films which are used in the fabrication of the interferometric modulator components, thus making it possible to use the same deposition parameters to fabricate the mask and the interferometric modulator components. The conductive mask 402 can be used to provide greater flexibility in the routing of electrical signals around the display device and help minimize resistance of electrical circuits providing signals to the interferometric electrodes by providing electrically parallel connections for the signals.

The various stages in the manufacture of a conductive mask 402 and the MEMS device will now be described with reference to FIGS. 12-17.

Figure 12:
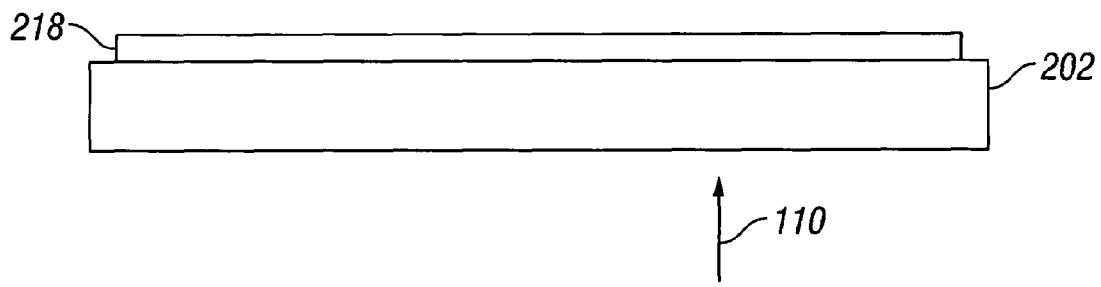
FIG. 12 is a cross-sectional view of a stage in the manufacture of a MEMS device having a conductive mask illustrating a reflective chrome layer deposited on a substrate.

FIG. 12 is a cross-sectional view of a stage in the manufacture of a MEMS device having a conductive mask illustrating a first reflective mask layer 218 deposited on a substrate 202. After an initial preparatory step wherein the substrate 202 is prepared, for example, cleaned, a first reflective mask layer 218 is deposited by sputter coating it onto substrate 202, according to one embodiment. In one exemplary embodiment, the thickness of first reflective mask layer 218 can be about 60 angstroms.

Figure 13:
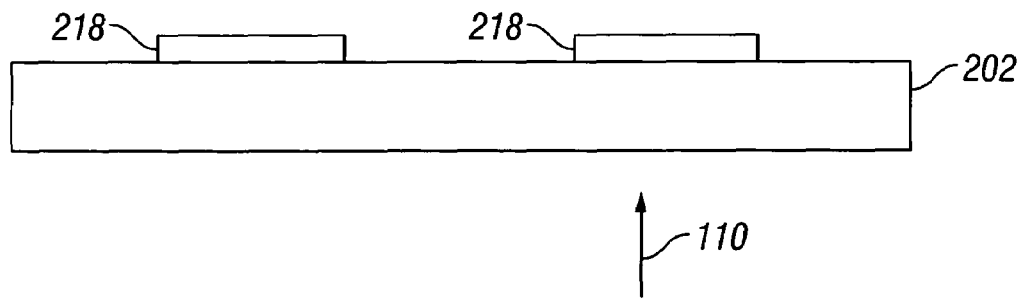
FIG. 13 is a cross-sectional view of a stage in the manufacture of a MEMS device having a conductive mask illustrating the reflective chrome layer of FIG. 12 with portions of the chrome layer removed.

FIG. 13 is a cross-sectional view of a stage in the manufacture of the MEMS device having a conductive mask illustrating the first reflective mask layer 218 of FIG. 12 with certain portions removed. For this fabrication, after the first reflective mask layer 218 is deposited, as shown in FIG. 12, the first reflective mask layer 218 is patterned and developed using conventional techniques to leave two or more portions or outcrops of chrome, which can serve as a base layer for a thin film stack which serves as a mask.

Figure 14:
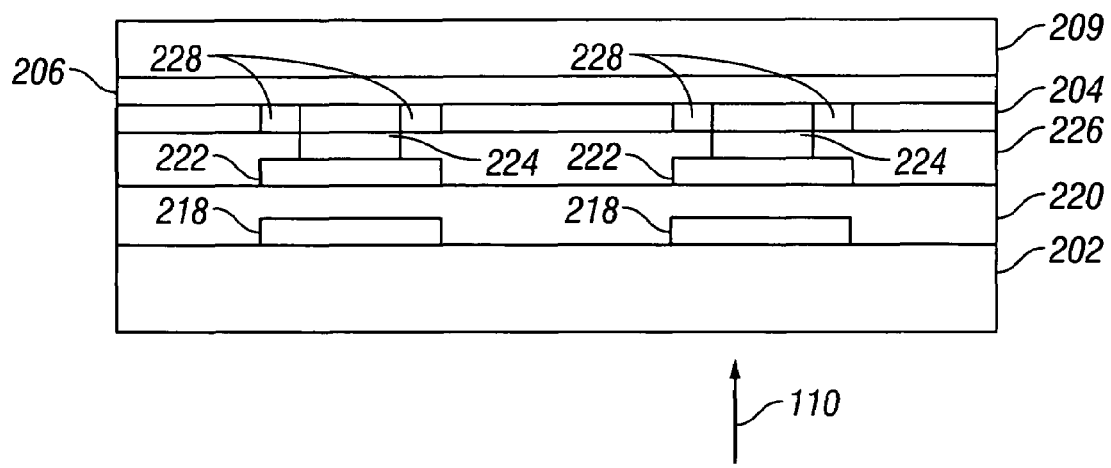
FIG. 14 is a cross-sectional view of a stage in the manufacture of a MEMS device having a conductive mask illustrating additional layers applied to the embodiment shown in FIG. 13.

FIG. 14 is a cross-sectional view of a stage in the manufacture of the MEMS device having a conductive mask illustrating additional layers that are fabricated on the embodiment shown in FIG. 13. As shown in FIG. 14, an oxide layer 220 is deposited on the substrate 202 covering the first reflective mask layer 218. In one embodiment the oxide layer 220 is about 300 to 800 angstroms in depth. This layer can be applied by sputter coating the $SiO_2$ onto the embodiment shown in FIG. 14. The thickness of the oxide layer 220 can depend on the quality of the color (e.g., black) state that is required for the mask, and it can also depend on the desired color of the mask.

Figure 16:
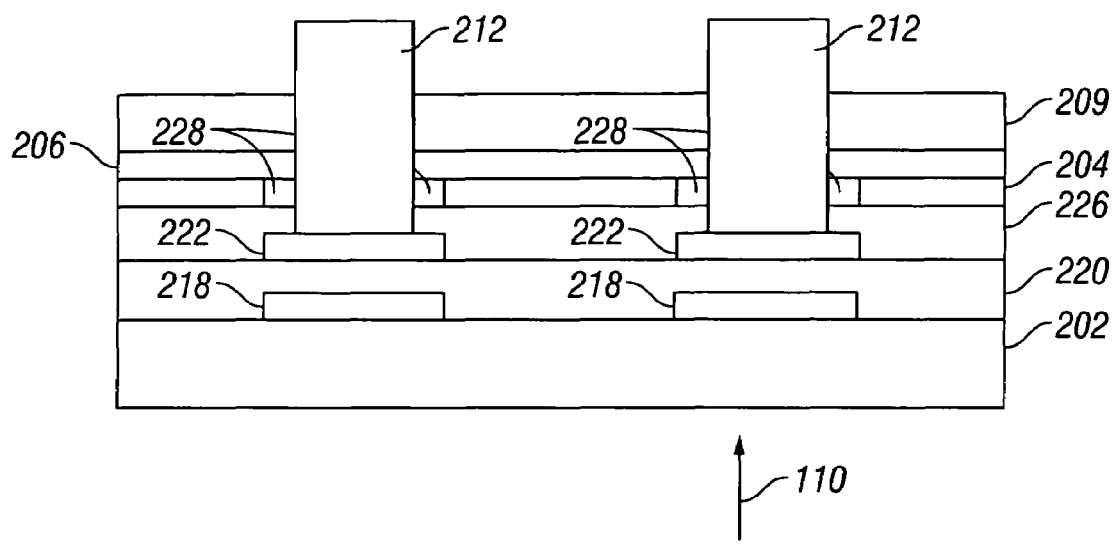
FIG. 16 is a cross-sectional view of a stage in the manufacture of a MEMS device having a conductive mask illustrating forming supports in the recesses shown in FIG. 15.

A second reflective layer 222 is deposited on the oxide layer 220, and the second reflective layer 222 is patterned and developed to form portions that correspond to the first reflective layer 218, forming a conductive mask comprising a thin film stack. Then an oxide layer 226 is deposited on the second reflective layer 222. Vias 224 can be formed in the oxide layer 226 so the second reflective layer 222 can be connected to a support 212, for example, as shown in FIG. 16. Electrical separators 228 can be formed in the electrode reflective layer 204, which is deposited on the oxide layer 226. The electrode reflective layer 204 is typically about 60 angstroms thick, its exact thickness being dependent on the required brightness of the ultimate display, a thinner layer yielding a brighter display. Based on the desired configuration and the utilization of the conductive mask, portions of the electrodes, for example, the electrode reflective layer 204, can be electrically separated by forming one or more separations 228 in the electrode reflective layer 204.

Thereafter, an oxide layer 206 and a sacrificial layer 209 are respectively sputter coated on to electrode reflective layer 204. The oxide layer 206 can comprise silicon oxide and can be about 300 to 800 angstroms thick, according to one embodiment. The sacrificial layer 209 can comprise comprising molybdenum and can typically be about 0.2 to 1.2 microns thick, according to one embodiment.

Figure 15:
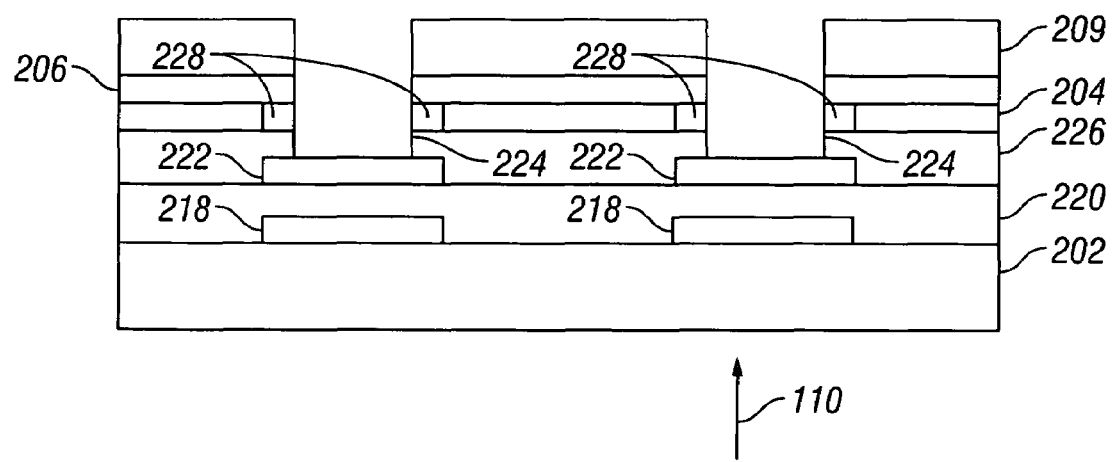
FIG. 15 is a cross-sectional view of a stage in the manufacture of a MEMS device having a conductive mask illustrating a patterning and etch step performed to form recesses for supports.

FIG. 15 is a cross-sectional view of a stage in the manufacture of a MEMS device having a conductive mask illustrating a patterning and etch step performed to form the recesses for supports. The patterning and an etching step is performed to form recesses which extend through the oxide layer 226 to the vias 224 and the second reflective layer 222, according to this embodiment. The vias 224 can be formed in the oxide layer 226 so the second reflective layer 222 can be connected to a support 212 (shown in FIG. 16). To form an electrical connection between the second reflective layer 222 of the conductive mask and another part of the MEMS device (e.g., the mechanical membrane 210 shown in FIG. 17) the support 212 can extend through the vias 224 to the second reflective layer 222, according to one embodiment. In another embodiment, the vias 224 are formed in the oxide layer 226 and are filled with an electrically conductive material which is connected to the support.

FIG. 16 is a cross-sectional view of a stage in the manufacture of a MEMS device having a conductive mask illustrating forming supports 212 in the recesses shown in FIG. 15. The supports 212 provide a structure that supports the movable mechanical membrane 210 (FIG. 17), and can be formed in the recesses by spinning a negative photoresist material over the thin film stack, exposing it through a suitable mask and developing it to form the supports 212. In this embodiment, electrical separators 228 isolate the supports 212 from the electrode reflective layer 204. Such separators 228 can be used to isolate the support 212 from the electrode reflective layer 204 when the support 212 comprises a conductive material.

Figure 17:
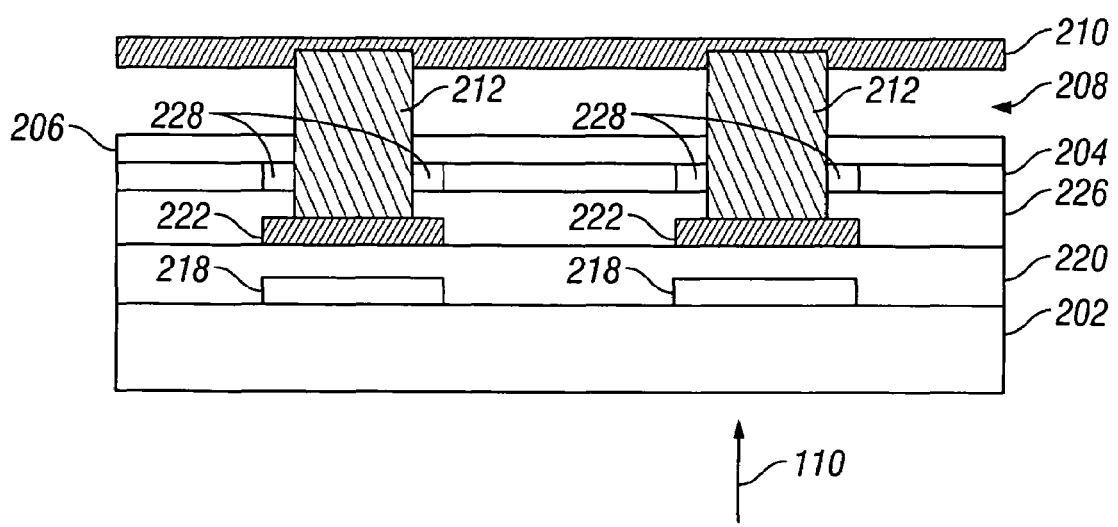
FIG. 17 is a cross-sectional view of a stage in the manufacture of a MEMS device having a conductive mask, illustrating the result of depositing a mechanical membrane onto the embodiment shown in FIG. 16 and removing a sacrificial layer to form an air gap.

FIG. 17 is a cross-sectional view of a stage in the manufacture of a MEMS device having a conductive mask, illustrating a mechanical membrane 210 deposited onto the embodiment shown in FIG. 16. The mechanical membrane 210 is deposited by sputter coating it onto the sacrificial layer 209. Thereafter, the sacrificial layer 209 is removed leaving an air gap 208. In one embodiment, the mechanical membrane 210 comprises an aluminum alloy. With the removal of the sacrificial layer 209, an air gap 208 is formed through which the mechanical membrane 516 moves when the interferometric modulator is actuated.

FIG. 17 also shows an embodiment of an electrical connection between the second reflective layer 222, the supports 212, and the mechanical membrane 210. Here, the conductive mask includes a dielectric stack that comprises a first reflective layer 218, an oxide layer 220, and a second reflective layer 222, that masks off non-active areas (for example, the supports 212) spaced apart from the active areas. In some embodiments, the conductive mask can comprise chrome, silver, aluminum or a dielectric stack so that one or more of the materials used to form the mask is capable of conducting electricity.

In this embodiment, the mask is a non-movable (e.g., static) interferometric element configured such that it causes the interference of light so that it reflects minimal light and appears black. The optical layer can be formed from ITO/Cr, ITO/Mo, ITO/Ti, Cr, Mo, Ti or other materials with similar properties. The dielectric layer is typically formed from $SiO_2$ or other dielectric materials, and the reflector is typically formed from aluminum, chromium or other metallic materials.

By fabricating the mask so that it comprises an electrically conductive material and using appropriately placed connections to a desired row and/or column electrode the mask can be used to reduce the resistance of the row and/or column electrode. For example, if a conductive mask, configured to always display black, is used in an array comprising a plurality of interferometric modulators, the conductive mask can be also be used as a conduction layer to decrease resistance of row and/or column electrodes that are used in the array to carry signals to the display elements aligned in rows and/or columns. In this embodiment, vias were created in the dielectric 226 to provide a recess for the support 212 and so it can connect to the second reflective layer 222, which is part of the conductive mask. It will be appreciated that there are many other possible embodiments to utilize a conductive mask. In some embodiments where the mask comprises a first conductive layer 218 and a second conductive layer 222, both conductive layers can be used as an electrical bus. In some embodiments, both conductive layers can be used as part of the same electrical bus. In other embodiments, the conductive layers are each used as part of separate electrical bus.

Figure 18:
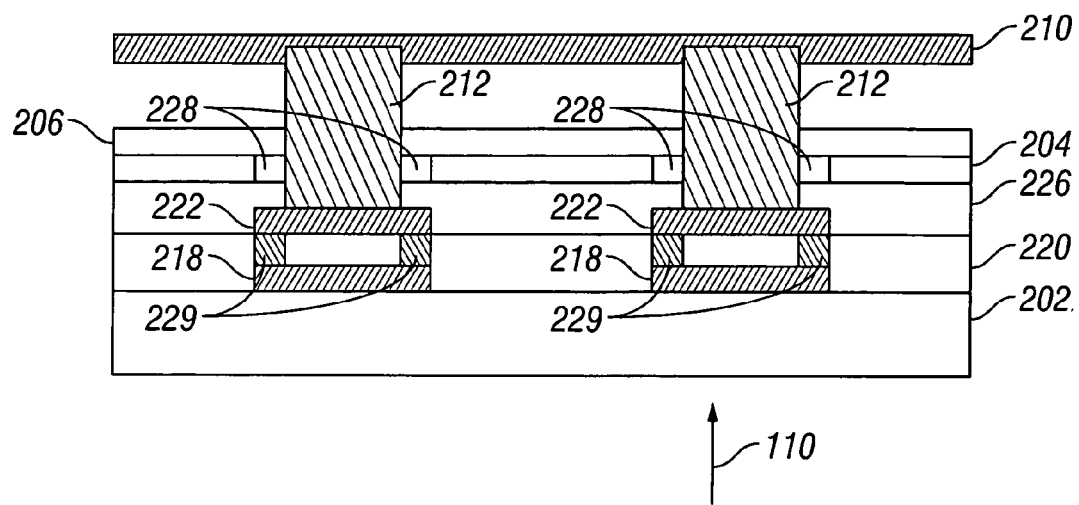
FIG. 18 is a cross-sectional view of a MEMS device illustrating an embodiment of a conductive mask where an electrically parallel connection is formed between both layers of the mask and a movable mechanical membrane.

FIG. 18-22 show various exemplary embodiments of a conductive mask in an interferometric modulator to provide an electrically parallel connection to an electrode. The embodiments can be fabricated using similar techniques as described hereinabove for the embodiment shown in FIG. 17. The conductive masks illustrated in FIGS. 18-22 are configured as non-movable interferometric elements, that provide one or more electrically paralleled connections for application of voltages to the modulating element. FIG. 18 is a cross-sectional view of a MEMS device illustrating an embodiment of a conductive mask where an electrically parallel connection is formed between both layers of the mask and a movable mechanical membrane. In FIG. 18, the mask comprises the first reflective layer 218 and the second reflective layer 222. The mask forms an electrically parallel connection to the mechanical membrane 210, a portion of one of the electrodes in the interferometric modulator, as indicated by the diagonally-lined areas. The first reflective layer 218 is electrically connected to the second reflective layer 222 by connectors 229. The supports 212 are made of a conductive material, for example, one of the conductive materials described herein, and are connected to the second reflective layer 222. Electrical separators 228 electrically isolate the supports 212 from the electrode reflective layer 204. The supports 212 are connected to the movable mechanical membrane 210 so that the first reflective layer 218 and the second reflective layer 222 form an electrically parallel connection with the mechanical membrane 210.

Figure 19:
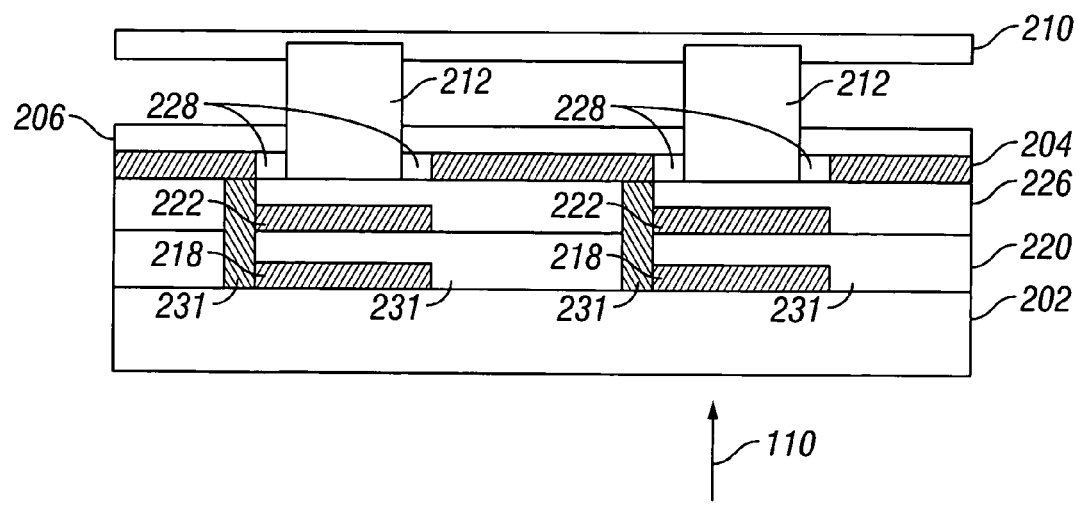
FIG. 19 is a cross-sectional view of a MEMS device illustrating an embodiment of a conductive mask where an electrically parallel connection is formed between both layers of the mask and a non-movable electrode layer.

FIG. 19 is a cross-sectional view of a MEMS device illustrating an embodiment of a conductive mask where an electrically parallel connection is formed between two conductive layers of a mask and the non-movable electrode layer 204. The first reflective layer 218 and the second reflective layer 222 form an electrically parallel connection to the electrode reflective layer 204, as indicated by the diagonally-lined areas. The first reflective layer 218 is electrically connected to the second reflective layer 222 by connectors 231, which also connect the first reflective layer 218 and the second reflective layer 222 to the electrode reflective layer 204. Electrical separators 228 electrically isolate the supports 212 from the electrode reflective layer 204.

FIG. 20 is a cross-sectional view of a MEMS device illustrating an embodiment of a conductive mask where an electrically parallel connection is formed between a first reflective layer 218 of the mask and the movable mechanical membrane 210. The first reflective layer 218 of the mask is electrically connected to the mechanical membrane 210 by the conductive connector 234 which runs through the support 212. The connector 234 is isolated from the support 212 and the second reflective layer 222 of the mask by electrical isolators 232, which are formed from a non-conductive material. Electrical isolators 228 isolate the support 212 from the electrode reflective layer 204. In embodiments where the support 212 is not formed from a conductive material, electrical isolators 232 and electrical isolators 228 may not be necessary to electrically isolate the support 212 from surrounding conductive material. In this embodiment, only the first reflective layer 218 forms an electrically parallel connection to the mechanical membrane 210.

FIG. 21 is a cross-sectional view of a MEMS device illustrating an embodiment of a conductive mask where an electrically parallel connection is formed between a first reflective layer 218, a second reflective layer 222 of the mask and a movable mechanical membrane 210. This embodiment is similar to the embodiment shown in FIG. 21, except that the first reflective layer 218 is connected to the second reflective layer 222 by the electrical connector 238. The first reflective layer 218 and the second reflective layer 222 are electrically connected to the mechanical membrane 210 by electrical connector 236, forming an electrical parallel connection between both layers of the conductive mask and the mechanical membrane 210. In this embodiment, the support 212 is not formed from a conductive material, thus isolators 232, although shown for clarity, would not be necessary to electrically isolate the support 212 from surrounding conductive material.

FIG. 22 is a cross-sectional view of a MEMS device illustrating an embodiment of a conductive mask where an electrically parallel connection is formed between a first reflective layer 218 of the mask and the electrode layer 204, as indicated by the diagonally lined areas. Another electrically parallel connection is formed between a second reflective layer of the mask 222 and a movable mechanical membrane 210, as indicated by the cross-hatched areas. In FIG. 22, the first electrically parallel connection is formed by electrically connecting the first reflective layer 218 of the mask to the electrode layer 204 by electrical connectors 240. Electrical isolators 228 isolate the electrode layer 204 from the conductive support 212. Electrical isolators 233 isolate the electrical connector 240 from the second reflective layer 222 of the mask. The second electrically parallel connection is formed by connecting the second reflective layer 222 of the mask to the support 212, which is connected to the mechanical membrane 210.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

The invention claimed is:

1. An optical device comprising:
    substrate;
    a light modulating element disposed on the substrate, the modulating element having an optical characteristic which changes in response to a voltage applied to the modulating element, wherein the modulating element comprises an interferometric modulator; and an electrically-conductive mask disposed on the substrate and spaced from the modulating element, the mask electrically coupled to the modulating element to provide one or more electrical paths for application of voltages to the modulating element.

2. The device of claim 1 wherein the mask is configured to appear black.

3. The device of claim 1, further comprising a column electrode electrically coupled to the mask to form an electrically parallel connection.

4. The device of claim 1, further comprising a row electrode electrically coupled to the mask to form an electrically parallel connection.

5. The device of claim 1, wherein the mask comprises a film stack.

6. The device of claim 1, wherein the mask is electrically coupled to the modulating element by one or more conductive vias.

7. An optical device comprising:
a substrate;
a light modulating element disposed on the substrate, the modulating element having an optical characteristic which changes in response to a voltage applied to the modulating element; and
an electrically-conductive mask disposed on the substrate and spaced from the modulating element, the mask electrically coupled to the modulating element to provide one or more electrical paths for application of voltages to the modulating element, wherein the mask is configured to appear a color other than black.

8. The device of claim 7, wherein the modulating element comprises an interferometric modulator.

9. The device of claim 7, wherein the mask comprises a film stack.

10. The device of claim 7, wherein the mask is electrically coupled to the modulating element by one or more conductive vias.

11. An optical device comprising:
a substrate;
a light modulating element disposed on the substrate, the modulating element having an optical characteristic which changes in response to a voltage applied to the modulating element; and
an electrically-conductive mask disposed on the substrate and spaced from the modulating element, the mask electrically coupled to the modulating element to provide one or more electrical paths for application of voltages to the modulating element, wherein the mask comprises a film stack comprising a first reflective layer and a second reflective layer.

12. The device of claim 11, wherein the first reflective layer is electrically connected to a first electrode and the second reflective layer is electrically connected to a second electrode.

13. The device of claim 11, wherein the first reflective layer and the second reflective layer are electrically connected to the same electrode.

14. The device of claim 11, wherein the first reflective layer is positioned a further distance from the substrate than the second reflective layer.

15. The device of claim 14, wherein the modulating element is electrically coupled to the first reflective layer of the film stack.

16. The device of claim 15, wherein the modulating element comprises a row electrode and wherein the row electrode is electrically coupled to the first reflective layer of the film stack.

17. The device of claim 11, wherein the modulating element comprises an interferometric modulator.

18. An optical device comprising:
a substrate;
a light modulating element disposed on the substrate, the modulating element having an optical characteristic which changes in response to a voltage applied to the modulating element; and
an electrically-conductive mask disposed on the substrate and spaced from the modulating element, the mask electrically coupled to the modulating element to provide one or more electrical paths for application of voltages to the modulating element, wherein the mask comprises one or more interferometric elements.

19. An optical device comprising:
a substrate;
a light modulating element disposed on the substrate, the modulating element having an optical characteristic which changes in response to a voltage applied to the modulating element; and
an electrically-conductive mask disposed on the substrate and spaced from the modulating element, the mask electrically coupled to the modulating element to provide one or more electrical paths for application of voltages to the modulating element, wherein the mask comprises one or more interferometric elements, and is light-absorbing.

20. An optical device comprising:
a substrate:
one or more light modulating elements disposed on the substrate, the one or more modulating elements having an optical characteristic which changes in response to a voltage applied to the one or more modulating elements; and
an electrically-conductive mask disposed on the substrate and spaced from the one or more modulating elements, the mask electrically coupled to the one or more modulating elements to provide one or more electrical paths for application of voltages to the one or more modulating elements wherein the mask comprises a film stack comprising a conductive reflective layer to which a voltage is applied to activate the one or more modulating elements.

21. The device of claim 20, wherein the one or more modulating elements comprise one or more interferometric modulators.

22. An optical device comprising:
a substrate;
a light modulating element disposed on the substrate, the modulating element having an optical characteristic which changes in response to a voltage applied to the modulating element: and
an electrically-conductive mask disposed on the substrate and spaced from the modulating element, the mask electrically coupled to the modulating element to provide one or more electrical paths for application of voltages to the modulating element, wherein the mask comprises a film stack comprising a non-light-absorbing dielectric material sandwiched between two light-reflecting materials.

23. The device of claim 22, wherein at least one of the two light-reflecting materials comprises silver, aluminum, or chromium.

24. An optical device comprising:

a substrate;

a light modulating element disposed on the substrate, the modulating element having an optical characteristic which changes in response to a voltage applied to the modulating element: and an electrically-conductive mask disposed on the substrate and spaced from the modulating element, the mask electrically coupled to the modulating element to provide one or more electrical paths for application of voltages to the modulating element, wherein the mask comprises a film stack, and wherein the film stack comprises;

a first light-reflecting layer disposed on the substrate;

a non-light-absorbing dielectric layer disposed on the first light-reflecting layer; and a second light-reflecting layer disposed on the non-light absorbing dielectric layer, wherein at least one of the first or second light-reflecting layers is electrically conductive.

25. The device of claim 24, wherein the first and second light-reflecting layers comprise metallic materials.

26. The device of claim 24, wherein the non-light absorbing dielectric layer comprises an oxide layer.

* * * * *

UNITED STATES PATENT AND TRADEMARK OFFICE
CERTIFICATE OF CORRECTION

PATENT NO. : 7,420,725 B2  Page 1 of 1
APPLICATION NO. : 11/119432
DATED : September 2, 2008
INVENTOR(S) : Manish Kothari It is certified that error appears in the above-identified patent and that said Letters Patent is hereby corrected as shown below:

| Column | Line | |
|---|---|---|
| Page 5 Col. 1 (Other Publications) | 58 | Delete "Microstruture" and insert -- Microstructure --. |
| Page 5 Col. 2 (Other Publications) | 72 | Delete "05255693.2" and insert -- 05255693.3 --. |
| 13 | 6 | Delete "an" and insert -- a --. |
| 16 | 65 | Delete "substrate" and insert -- a substrate --. |
| 18 | 34 | Delete "substrate:" and insert -- substrate; --. |
| 18 | 45 | Delete "elements" and insert -- elements, --. |
| 18 | 56 | Delete "element:" and insert -- element; --. |
| 19 | 6 | Delete "element:" and insert -- element; --. |
| 19 | 12 | Delete "comprises;" and insert -- comprises --. |
| 20 | 6 | Delete "or" and insert -- and --. |

Signed and Sealed this

Third Day of March, 2009

JOHN DOLL
*Acting Director of the United States Patent and Trademark Office*